(12) United States Patent
Kaku

(10) Patent No.: US 7,627,148 B2
(45) Date of Patent: Dec. 1, 2009

(54) IMAGE DATA PROCESSING APPARATUS AND METHOD, AND IMAGE DATA PROCESSING PROGRAM

(75) Inventor: Toshihiko Kaku, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 473 days.

(21) Appl. No.: 11/172,966

(22) Filed: Jul. 5, 2005

(65) Prior Publication Data
US 2006/0008145 A1    Jan. 12, 2006

(30) Foreign Application Priority Data

Jul. 6, 2004    (JP)    ............................. 2004-198930
Aug. 27, 2004    (JP)    ............................. 2004-248093

(51) Int. Cl.
G06K 9/00    (2006.01)
(52) U.S. Cl. ...................................... 382/118; 382/173
(58) Field of Classification Search ................... 382/118
See application file for complete search history.

(56) References Cited

U.S. PATENT DOCUMENTS

| 5,715,325 | A | * | 2/1998 | Bang et al. | 382/118 |
| 5,742,703 | A | * | 4/1998 | Lin et al. | 382/176 |
| 5,802,204 | A | * | 9/1998 | Basehore | 382/224 |
| 5,864,630 | A | * | 1/1999 | Cosatto et al. | 382/103 |
| 5,933,527 | A | * | 8/1999 | Ishikawa | 382/190 |
| 6,091,836 | A | * | 7/2000 | Takano et al. | 382/118 |
| 6,108,437 | A | * | 8/2000 | Lin | 382/118 |
| 6,188,777 | B1 | * | 2/2001 | Darrell et al. | 382/103 |
| 6,529,630 | B1 | * | 3/2003 | Kinjo | 382/190 |
| 6,697,502 | B2 | * | 2/2004 | Luo | 382/115 |
| 6,775,403 | B1 | * | 8/2004 | Ban et al. | 382/154 |
| 6,798,921 | B2 | * | 9/2004 | Kinjo | 382/282 |
| 6,879,709 | B2 | * | 4/2005 | Tian et al. | 382/118 |
| 6,920,237 | B2 | * | 7/2005 | Chen et al. | 382/117 |
| 7,003,135 | B2 | * | 2/2006 | Hsieh et al. | 382/103 |
| 2001/0031073 | A1 | * | 10/2001 | Tajima | 382/118 |
| 2002/0191818 | A1 | * | 12/2002 | Matsuo et al. | 382/118 |
| 2003/0026479 | A1 | * | 2/2003 | Thomas et al. | 382/224 |
| 2003/0053663 | A1 | * | 3/2003 | Chen et al. | 382/117 |
| 2003/0053664 | A1 | * | 3/2003 | Pavlidis et al. | 382/117 |
| 2003/0053685 | A1 | * | 3/2003 | Lestideau | 382/164 |
| 2003/0174869 | A1 | * | 9/2003 | Suarez | 382/118 |
| 2003/0179911 | A1 | * | 9/2003 | Ho et al. | 382/194 |
| 2004/0034611 | A1 | * | 2/2004 | Kee et al. | 706/20 |
| 2005/0185845 | A1 | * | 8/2005 | Luo et al. | 382/224 |
| 2006/0008145 | A1 | * | 1/2006 | Kaku | 382/173 |
| 2006/0133654 | A1 | * | 6/2006 | Nakanishi et al. | 382/118 |
| 2006/0182348 | A1 | * | 8/2006 | Kinjo | 382/203 |

FOREIGN PATENT DOCUMENTS

JP    9-101579 A    4/1997
JP    11-316845 A    11/1999

* cited by examiner

Primary Examiner—Sath V Perungavoor
(74) Attorney, Agent, or Firm—Sughrue Mion, PLLC

(57) ABSTRACT

When a face image of a character in an image represented by image data fed to a mask data creating apparatus is detected, face image areas of the detected character are respectively extracted by different two types of processing. An appropriate degree is calculated for each of the face image areas extracted by the two types of extraction processing. The face area for which the higher relevance factor is calculated is used, to create mask data.

27 Claims, 37 Drawing Sheets

*Fig. 15*

|  | AREA DIVISION EXTRACTION PROCESSING | EDGE SEARCH EXTRACTION PROCESSING | ROUNDNESS UTILIZATION EXTRACTION PROCESSING |
|---|---|---|---|
| FACE A | 10 | 21 | 6 |
| FACE B | 15 | 11 | 28 |
| FACE C | 17 | 10 | 12 |

IMAGE DATA PROCESSING APPARATUS AND METHOD, AND IMAGE DATA PROCESSING PROGRAM

BACKGROUND OF THE INVENTION

1. Field of the Invention

The present invention relates to an image data processing apparatus and method, and an image data processing program, and particularly, to an image data processing apparatus, method, and program for partitioning off data representing a particular image included in an image represented by given image data (hereinafter referred to as an input image) from the other portion (extracting data from the other portion) and outputting the data.

2. Description of the Background Art

An image represented by digital image data obtained by a digital camera is displayed on a display screen of a display device, or is printed on printing paper by a printer. A subject image is visibly displayed on the display screen or the printing paper. In order to reproduce (playback) the subject image displayed on the display screen or the printing paper more beautifully (or more faithfully), digital image data is subjected to white balance correction, gamma correction, and other corrections in a digital camera, a printer, a personal computer, etc.

Image data may, in some cases, be subjected to correction processing by paying attention to a particular image portion in the subject image. In a case where the face of a character is included in the subject image, for example, a white balance correction value, a gamma correction value, and correction values for the other corrections may, in some cases, be calculated using the face of the character in the subject image as an object such that the face of the character in the subject image is reproduced (displayed) more beautifully (or more faithfully).

In order to subject the image data to the correction processing by paying attention to the particular image portion in the subject image, the particular image portion must be detected (extracted) from the subject image. JP-A-11-316845 discloses that a plurality of subject extractions that differ in properties are performed, to synthesize subjects respectively extracted by the subject extractions, and subject extractions which differ in properties are further performed when the results of the synthesis do not satisfy the judgment criteria, to extract the main subject using the results.

In JP-A-11-316845, the results of the plurality of subject extractions are synthesized. When the results of the extraction that are incorrect (or inappropriate) are obtained, therefore, the results of the extraction are reflected on the extraction of the main subject. When image correction is made on the basis of the results of the extraction, the results of the image correction are also adversely affected.

As a method of distinguishing image data representing a particular image portion included in an image, for example, a face image portion of a character from the other image portion (an image portion other than the face image portion of the character) to extract (partition off) only the image data representing the face image portion, JP-A-9-101579 describes a method of extracting a face image portion utilizing color information. In JP-A-9-101579, it is judged whether or not the hue of each of pixels composing an image is included in a skin color range, to divide the original image into a skin color area and a non-skin color area. Further, an edge in the original image is detected, to classify the original image into an edge portion and a non-edge portion. An area positioned within the skin color area, composed of the pixels classified as the non-edge portion, and enclosed by the pixels judged as the edge portion is extracted as a face candidate area.

In the method of extracting the face image portion utilizing color information, judgment whether the color for each of the pixels composing the image is a color belonging to the skin color range greatly affects the precision of the extraction of the face image portion. In different subject images obtained by picking up the same subject under different light sources (e.g., a fluorescent light source, a tungsten light source, etc.), for example, therefore, the pixels (pixel ranges) that are judged to have the color belonging to the skin color range differ.

On the other hand, processing for detecting the particular image portion included in the image on the basis of the shape without using color information is previously performed, and processing for extracting the face image portion using a rectangular area including the detected particular image portion as a processing object is also considered. Since the processing for detecting the particular image portion is performed without using color information, the processing for extracting the face image portion that is hardly affected by the type of light source at the time of photographing.

In a method of extracting the face image portion included in the image on the premise that the processing for detecting the particular image portion on the basis of the shape, however, it is essential to the subsequent face image extraction processing that the face image portion is naturally detected. In face detection processing for a face image of a character, for example, if a front face is included in the image, the face image can be generally detected. When the face image is included in the image but is an image representing a side face, however, detection of the face image fails. Eventually, extraction of the face image may end in failure.

SUMMARY OF THE INVENTION

An object of the present invention is to allow for area partitioning (area extraction) with high precision.

Another object of the present invention is to realize area partitioning (area extraction) in a short processing time period.

Still another object of the present invention is to generate mask data for masking an area partitioned off (extracted) with high precision or an area partitioned off (extracted) in a short processing time period.

A further object of the present invention is to allow for partitioning (extraction) of a particular image portion even when detection of a particular image fails while realizing area partitioning (extraction) processing with high precision utilizing the results of the detection of the particular image.

An image data processing apparatus according to a first invention is characterized by comprising particular image detection means for detecting whether or not a particular image exists in an image represented by given image data; a plurality of types of area partitioning means for respectively partitioning off, when the existence of particular image is detected by the particular image detection means, an area of the existing particular image by different types of partitioning processing; appropriateness calculation means for calculating, with respect to each of a plurality of partitioned areas respectively obtained by the plurality of types of area partitioning means, a appropriateness degree representing the degree to which the shape thereof is appropriate as a partitioning shape representing a contour of the particular image; and output means for outputting data representing the partitioned area for which the highest appropriateness degree is calculated on the basis of the plurality of appropriateness degrees calculated by the appropriateness calculation means.

An image data processing method according to the first invention is characterized by comprising the steps of detecting whether or not a particular image exists in an image represented by given image data; respectively partitioning off, when the existence of particular image is detected, an area of the existing particular image by a plurality of different types of partitioning processing; calculating, with respect to each of two or more partitioned areas respectively obtained by the plurality of types of partitioning processing, a appropriateness degree representing the degree to which the shape thereof is appropriate as a partitioning shape representing a contour of the particular image; and outputting data representing the partitioned area for which the highest appropriateness degree is calculated on the basis of the calculated appropriateness degrees.

When a particular image exists in an image represented by given image data (hereinafter referred to as an input image), the existence of particular image is detected. For the existing particular image, an area of the particular image is partitioned off (extracted) by a plurality of types of processing.

The particular image means an image portion having a particular shape included in the input image, for example, an image representing the face of a character. The image representing the face of the character included in the input image is detected by pattern matching, for example. For the detected image representing the face of the character, a face image portion (face image area) is partitioned off by each of the plurality of types of processing. When the input image includes a plurality of face images, and the plurality of face images included in the input image are detected, each of the plurality of face images is partitioned off by the plurality of types of area partitioning processing.

The plurality of types of area partitioning processing are common in processing for partitioning off an area of the particular image but differ in the contents of the processing (data, an algorithm, etc. used for partitioning). Known as the face partitioning processing (face extraction processing) for partitioning off a face image of a character are (1) area division extraction processing utilizing clustering, (2) edge search extraction processing for searching for an edge radially from the center of the face, (3) labeling extraction processing utilizing the continuity of adjacent pixel values, (4) extraction processing utilizing the continuity of edges in a polar coordinate image, (5) extraction processing utilizing roundness, etc. If the particular image is the face image of the character, and the area partitioning processing is for partitioning off (extracting) the area of the face image, two or more of the plurality of types of extraction processing (partitioning processing) can be employed as the area partitioning processing (means).

For each of the partitioned areas respectively obtained by the plurality of types of area partitioning means, a appropriateness degree representing the degree to which the shape thereof is appropriate as a partitioning shape representing a contour of the particular image is calculated. The appropriateness degree is an index indicating whether or not the shape of the partitioned area is appropriate (correct or preferable) as a partitioning shape representing a contour of the particular image, and includes a numerical value, classification (large, medium, small, etc.), a grade, and other degrees.

When the partitioned area is the area of the face image, for example, the roundness thereof (or the degree obtained on the basis of the roundness) can be used as the appropriateness degree. Since the face of the character is in a substantially elliptical shape, the closer the roundness of the face image area is to the roundness of the ellipse, the higher (the larger) the calculated appropriateness degree is. On the other hand, the farther the roundness of the face image area is apart from the roundness of the ellipse, the lower (the smaller) the calculated appropriateness degree is.

Data representing the partitioned area for which the highest one of the calculated appropriateness degrees is calculated is outputted. The data representing the partitioned area includes data representing a position and a range that are occupied by the partitioned area in the entire input image.

The outputted data representing the partitioned area can be used for creating mask data. Mask data representing an image obtained by masking the partitioned area included in the input image (or mask data representing an image obtained by masking a portion other than the partitioned area included in the input image) is created on the basis of the data representing the partitioned area.

According to the first invention, the partitioned areas are thus respectively obtained by the plurality of types of area partitioning processing, and the data representing the partitioned area for which the highest appropriateness degree is calculated out of the plurality of partitioned areas is outputted. Data representing the partitioned area obtained with high precision (partitioned off more correctly) is outputted. When the mask data is created on the basis of the data representing the partitioned area, the created mask data becomes highly precise. In a case where the particular image is used as an object of image correction, the precision of the image correction processing also becomes high.

An image data processing apparatus according to a second invention is characterized by comprising particular image detection means for detecting whether or not a particular image exists in an image represented by given image data; a plurality of types of area partitioning means for respectively partitioning off, when the existence of particular image is detected by the particular image detection means, an area of the existing particular image by different types of partitioning processing; appropriateness calculation means for calculating a appropriateness degree representing the degree to which the shape of each of partitioned areas respectively obtained by the area partitioning means is appropriate as a partitioning shape representing a contour of the particular image; comparison judgment means for comparing the appropriateness degree calculated by the appropriateness calculation means with a given value; control means for repeating, when the comparison judgment means judges that the appropriateness degree is not more than the given value, a sequence comprising area partitioning processing performed by the other area partitioning means, appropriateness calculation processing performed by the appropriateness calculation means, and comparison judgment processing performed by the comparison judgment means until the comparison judgment means judges that the appropriateness degree exceeding the given value is obtained; first output means for outputting, when the comparison judgment means judges that the appropriateness degree exceeds the given value, data representing the partitioned area obtained by the area partitioning means; and second output means for outputting, when all of the appropriateness degrees for the partitioned areas respectively obtained by all the area partitioning means are not more than the given value, data representing the partitioned area for which the highest appropriateness degree is calculated.

An image data processing method according to the second invention is characterized by comprising the steps of detecting whether or not a particular image exists in an image represented by given image data; respectively partitioning off, when the particular image is detected, an area of the existing particular image by one of a plurality of different types of partitioning processing; calculating a appropriateness degree representing the degree to which the shape of each of the partitioned areas obtained by the partitioning is appropriate as a partitioning shape representing a contour of the particular image; comparing the calculated appropriateness degree with a given value; repeating, when the appropriateness degree is not more than the given value, a sequence comprising the other area partitioning processing, appropriateness calculation processing, and comparison processing until the appropriateness degree exceeding the given value is obtained; outputting, when the appropriateness degree exceeds the given value, data representing the partitioned area for which the appropriateness degree is calculated; and outputting, when all the appropriateness degrees for the partitioned areas respectively obtained by all the types of partitioning processing are not more than the given value, data representing the partitioned area for which the highest appropriateness degree is calculated.

In the image data processing apparatus (method) according to the second invention, the plurality of types of area partitioning processing are controlled in order (continuously). That is, the one partitioned area is first obtained by the one area partitioning means. When the appropriateness degree for the partitioned area is not more than the given value, the partitioning processing by the other area partitioning means is performed, the appropriateness degree is calculated, and the appropriateness degree and the given value are compared with each other. The partitioning processing, the appropriateness calculation, and the compassion between the appropriateness degree and the given value are repeated until the appropriateness degree exceeding the given value is obtained.

When the partitioned area for which the appropriateness degree exceeding the given value is calculated is obtained, the data representing the partitioned area is outputted.

When all of the appropriateness degrees for the partitioned areas respectively obtained by all the types of partitioning processing are not more than the given value, the data representing the partitioned area for which the highest appropriateness degree is calculated is outputted, as in the above-mentioned first invention.

According to the second invention, when the partitioned area for which the appropriateness degree exceeding the given (predetermined) value is calculated is obtained, the partitioning processing by the other area partitioning means is not performed. A processing time period can be shortened while keeping the precision of the outputted data representing the partitioned area at a predetermined value or more.

The order of execution of the partitioning processing by the area partitioning means may be based on a previously determined order, or may be an order determined on the basis of a user's instruction.

An image data processing apparatus according to a third invention is characterized by comprising particular image detection means for detecting whether or not a particular image exists in an image represented by given image data; a plurality of types of area partitioning means for respectively partitioning off, when the existence of particular image is detected by the particular image detection means, an area of the existing particular image by different types of partitioning processing; appropriateness calculation means for calculating, with respect to each of a plurality of partitioned areas respectively obtained by the plurality of types of area partitioning means, a appropriateness degree representing the degree to which the shape thereof is appropriate as a partitioning shape representing a contour of the particular image; first output means for outputting data representing an OR area of the one or the plurality of partitioned areas, excluding the partitioned area for which the appropriateness degree of not more than a given value is calculated, obtained by the area partitioning means; and second output means for outputting, when all the appropriateness degrees for the partitioned areas respectively obtained by all the area partitioning means are not more than the given value, data representing the partitioned area for which the highest appropriateness degree is calculated.

An image data processing method according to the third invention is characterized by comprising the steps of detecting whether or not a particular image exists in an image represented by given image data; respectively partitioning off, when the existence of particular image is detected, an area of the existing particular image by a plurality of different types of partitioning processing; calculating, with respect to each of a plurality of partitioned areas respectively obtained by the plurality of types of partitioning processing, a appropriateness degree representing the degree to which the shape thereof is appropriate as a partitioning shape representing a contour of the particular image; outputting data representing an OR area of the one or the plurality of partitioned areas, excluding the partitioned area for which the appropriateness degree of not more than a given value is calculated; and outputting, when all the appropriateness degrees for the partitioned areas respectively obtained by all the types of partitioning processing are not more than the given is value, data representing the partitioned area for which the highest appropriateness degree is calculated.

In the image data processing apparatus (method) according to the third embodiment, the data representing an OR area (logical add area) of the partitioned areas for which the appropriateness degrees exceeding the given (predetermined) value are calculated is outputted. Since only the partitioned areas for which the appropriateness degrees exceeding the given value are obtained are used for the OR area, data representing an area including the plurality of partitioned areas can be outputted while keeping the precision of the outputted data representing the OR area at a given value or more.

In the third invention, when the number of partitioned areas for which the appropriateness degree exceeding the given value is obtained is one, data representing the partitioned area is outputted. This is not excluded by the OR area in the third invention.

In one embodiment, each of the first, second, and third image data processing apparatuses comprises particular image number detection means for detecting the number of particular images detected by the particular image detection means, comparison judgment means for comparing the number of particular images detected by the particular image number detection means with a given number, importance calculation means for calculating, when the comparison judgment means judges that the detected number of particular images is more than the given number, an importance degree for each of the plurality of particular images detected by the particular image detection means, and selection means for selecting the particular images whose number is the same as the given number out of the plurality of particular images included in the image represented by the image data on the basis of the importance degrees calculated by the importance calculation means, the area partitioning means respectively obtaining the partitioned areas for the plurality of particular images selected by the selection means.

In a case where a large number of particular images exists in the input image, when the partitioning processing is performed for all the large number of particular images, a processing time period is lengthened. In some cases, the partitioned areas need not necessarily be partitioned off for all the large number of particular images. In the above-mentioned embodiment, when the number of particular images is more than the given (designated) number, the particular images whose number is the same as the given number are selected out of the plurality of particular images. The partitioned areas are respectively obtained for the selected particular images whose number is the same as the given number.

The particular images are selected on the basis of the importance degrees. The importance degree is one with which each of the plurality of particular images is labeled from the viewpoint of judgment whether or not it is important. There is an empirical rule that in a case where a plurality of face images exist in an input image, the closer the face image is positioned to the center of the input image, the more important the face image is in many cases. In a case where the empirical rule is used, the distances between the detected plurality of face images and the center of the input image are respectively calculated. The importance degrees are respectively calculated for the face images such that the shorter the calculated distance is, the higher the importance degree with which the face image is labeled is.

The importance degree for each of the particular subject images can be calculated using the size, the inclination, and the pattern matching score of the particular subject image, and their combinations in addition to the calculation of the importance degree using the distance.

The present invention also provides a program for causing a computer to perform the image data processing based on each of the first, second, and third inventions.

The image data processing apparatuses, image data processing methods, and programs according to the first, second, and third inventions can be suitably incorporated as parts of apparatuses including devices for performing predetermined signal processing (correction processing) for digital image data, for example, a digital camera, a printer, a personal computer, etc. (methods of controlling the apparatuses and programs for controlling the apparatuses).

A particular image area partitioning apparatus according to a fourth invention is characterized by comprising particular image detection means for detecting whether or not a particular image exists in an image represented by given image data; first particular image area partitioning means for partitioning off, when the existence of particular image is detected by the particular image detection means, an area of the existing particular image, to output data representing a partitioned area obtained by the partitioning; and second particular image area partitioning means for dividing, when the existence of particular image is not detected by the particular image detection means, the image represented by the given image data into particular image color areas representing the color of the particular image and the other color areas, and outputting, out of the particular image color areas, data representing the particular image color area having a shape conforming to the shape of the particular image.

According to the present invention, it is first detected whether or not the particular image exists in the image represented by the given image data. When the particular image exists in a predetermined shape in an image represented by the given image data (hereinafter referred to as an input image), it can be detected that the particular image exists in the input image. For example, the existence of an image portion representing the front face of a character included in the input image can be detected by pattern matching relating to shapes.

When it is detected that the particular image exists in the input image, the area of the particular image is partitioned off utilizing the results of the detection, and the data representing the partitioned area is outputted.

In one embodiment, the first particular image area partitioning means is for setting a plurality of projection information creating windows having a predetermined shape radially from the center of an image represented by image data including a detected particular image, creating projection information obtained by adding, with respect to each of image portions within the set plurality of projection information creating windows, image information for each unit pixel position in the radial direction from the center of the image, determining, with respect to each of the image portions within the plurality of projection information creating windows, the boundary position between the particular image and the image other than the particular image on the basis of the created projection information, and connecting the determined plurality of boundary positions adjacent to one another, to partition off the particular image area. For each of the projection information creating windows, the boundary position between the particular image and the image other than the particular image is determined by the projection information. The particular image area is partitioned off by connecting the plurality of boundary positions adjacent to one another.

When the particular image included in the input image can be thus detected, processing for partitioning off the particular image from the other image portion (extracting the particular image area) is performed for the detected particular image. Since the approximate position of the particular image is previously recognized (detected) by the detection processing, the particular image area partitioning processing with relatively high precision can be performed.

In a case where the existence of particular image cannot be detected, although it exists in the input image, second particular image area partitioning processing utilizing color information is performed. In the second particular image area partitioning processing, an image represented by given image data is divided into particular image color areas representing the color of the particular image and the other color areas. Out of the particular image color areas, the particular image color area having a shape conforming to the shape of the particular image is outputted.

For example, suppose the particular image is a face image of a character. Further, suppose the face image included in the input image represents a side face. In this case, the face image cannot, in some cases, be detected, although it exists in the input image. In this case, the second particular image area partitioning processing is performed. That is, the face of the character includes a skin color. Therefore, the input image can be divided into image areas having the skin color and image areas not having the skin color. Out of the image areas having the skin color, the area having a shape conforming to the shape of the face of the character (including a shape close to the shape of the face of the character) is outputted.

According to the present invention, in a case where the particular image included in the input image can be detected, particular image area partitioning processing is performed utilizing the results of the detection, that is, on the premise that the particular image exists at the position of the detected particular image. Further, in a case where the particular image included in the input image cannot be detected, the particular image is partitioned off utilizing color information. Even when the detection of the particular image fails, the particular image area can be partitioned off while realizing area partitioning processing with high precision utilizing the results of the detection of the particular image.

Preferably, the particular image area partitioning apparatus further comprises particular image number detection means for detecting the number of particular images detected by the particular image detection means, comparison judgment means for comparing the number of particular images detected by the particular image number detection means with a given number, importance calculation means for calculating, when the comparison judgment means judges that the detected number of particular images is more than the given number, an importance degree for each of the particular images detected by the particular image detection means, and selection means for selecting the particular images whose number is the same as the given number out of the particular images included in the image represented by the image data on the basis of the importance degrees calculated by the importance calculation means, the first particular image area partitioning means partitions off, for the particular images, corresponding to the given number, selected by the selection means, the area of each of the particular images.

In a case where a large number of particular images exist in the input image, when the partitioning processing is performed for all the large number of particular images, a processing time period is lengthened. In some cases, the partitioned areas need not necessarily be partitioned off for all the large number of particular images. In the above-mentioned embodiment, when the number of particular images is more than the given (designated) number, the particular images whose number is the same as the given number are selected out of the plurality of particular images. The first partitioning processing is performed for the selected particular images.

The particular images are selected on the basis of the importance degrees. The importance degree is one with which each of the plurality of particular images is labeled from the viewpoint of judgment whether or not it is important (significant). There is an empirical rule in a case where a plurality of face images are included in an input image, the closer the face image is positioned to the center of the input image, the more important the face image is in many cases. In a case where this empirical rule is used, the distances between the detected plurality of face images and the center of the input image are respectively calculated. The importance degrees are respectively calculated for the face images such that the shorter the calculated distance is, the higher the importance degree with which the face image is labeled is.

The importance degree for each of the particular images can be also calculated using the size and the pattern matching score of the particular image, and their combinations in addition to the calculation of the importance degree using the distance.

The fourth invention also provides a particular image area partitioning method and a program for causing a computer to perform the above-mentioned particular image area partitioning processing.

The particular image area partitioning apparatus and method, and the particular image area partitioning processing program according to the fourth invention can be suitably incorporated as parts of an apparatus or a system including devices for performing predetermined signal processing (correction processing) for digital image data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 shows the contents of a appropriateness memory;

DESCRIPTION OF THE PREFERRED EMBODIEMNTS

First Embodiment

A mask data creating apparatus is an apparatus for detecting, on the basis of image data representing an image included in an image representing the face of a character, a portion representing the face of the character (a face image), extracting (partitioning off) an area of the detected face image (a face image area), and creating mask data relating to the extracted face image area. The mask data created by the mask data creating apparatus can be used for various types of image processing for the image data. For example, the created mask data is used so that the position and the range of the face image area included in the input image are specified. Therefore, processing for subjecting the image data to white balance correction, gamma correction, and other corrections, for example, can be performed using the face image area as an object such that the specified face image area is reproduced (displayed) more beautifully (or more faithfully).

(i) First Mask Data Creating Apparatus

Figure 1:
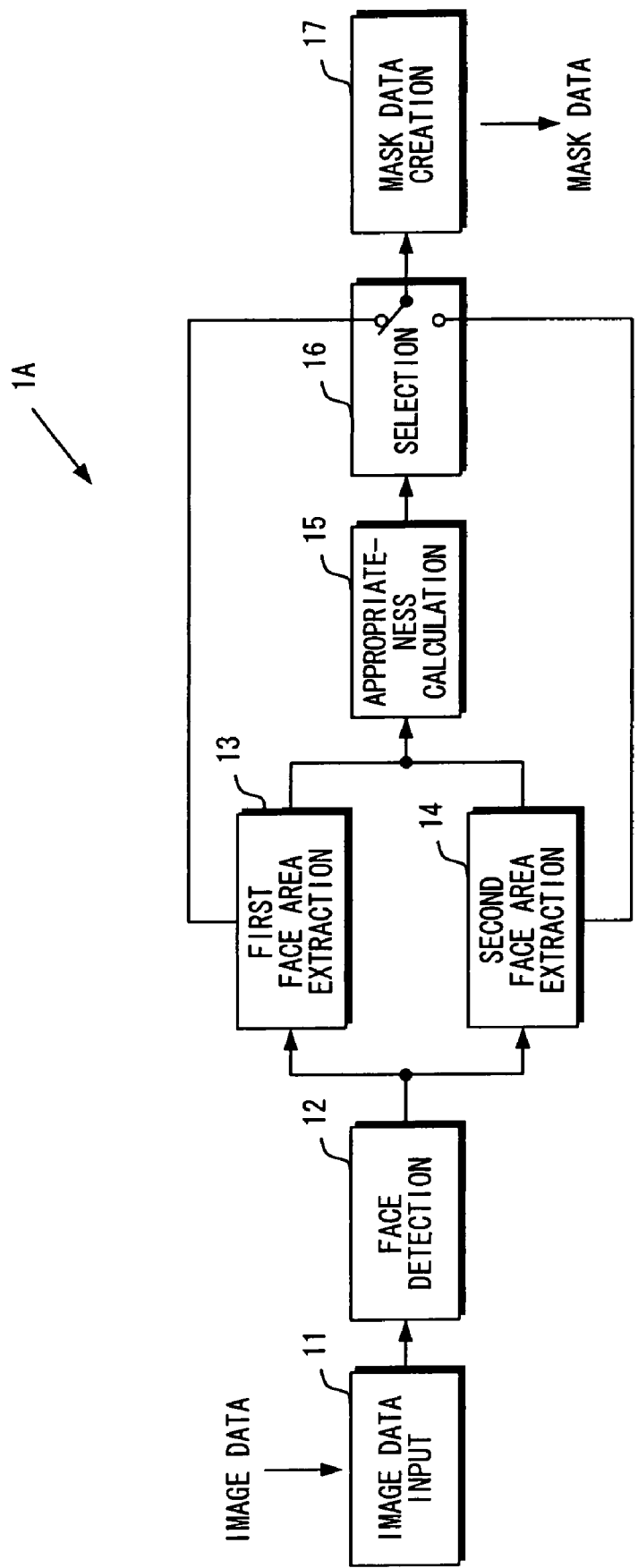
FIG. 1 is a functional block diagram of a first mask data creating apparatus.
Figure 2:
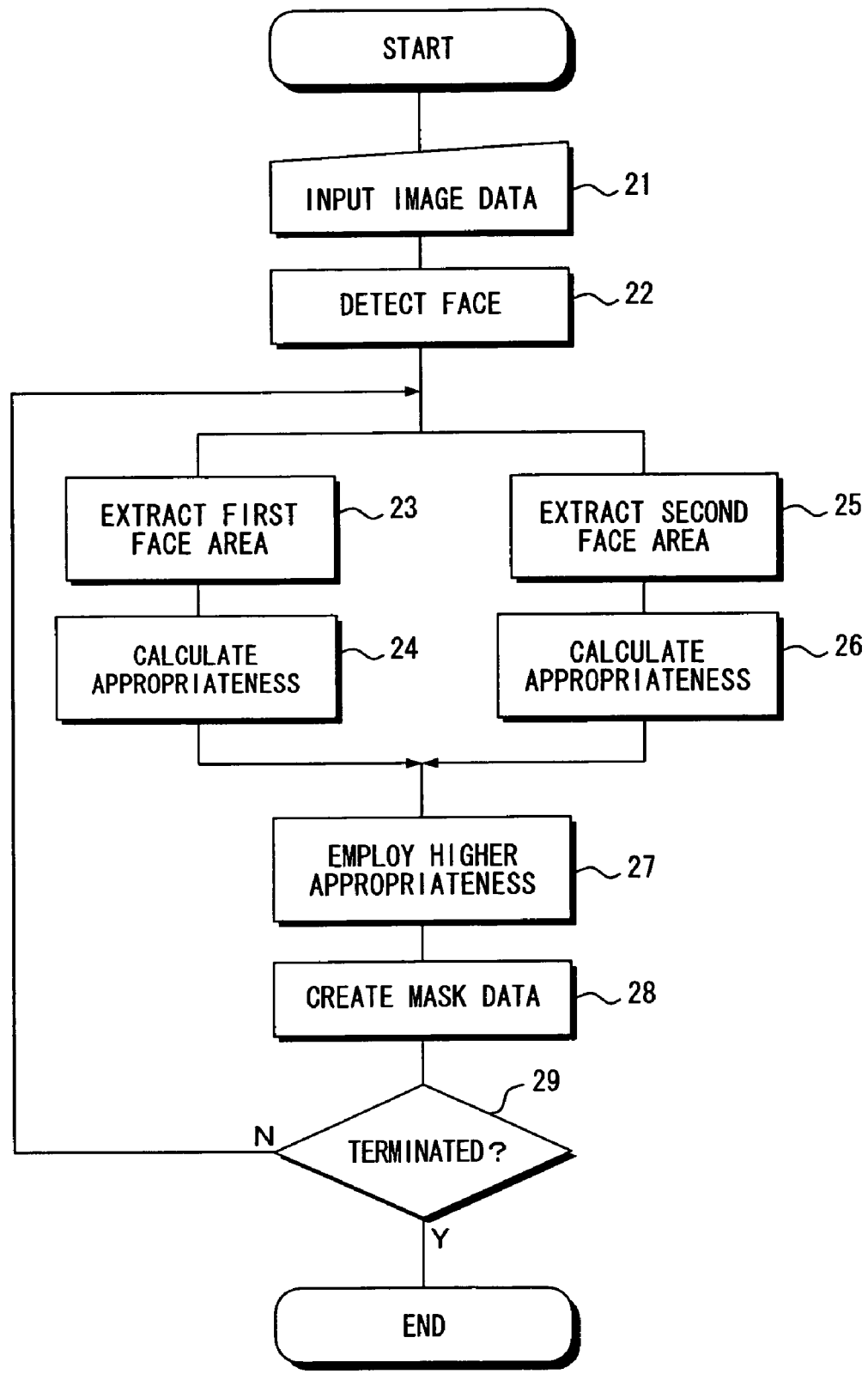
FIG. 2 is a flow chart showing the flow of operations of the first mask data creating apparatus.
Figure 3:
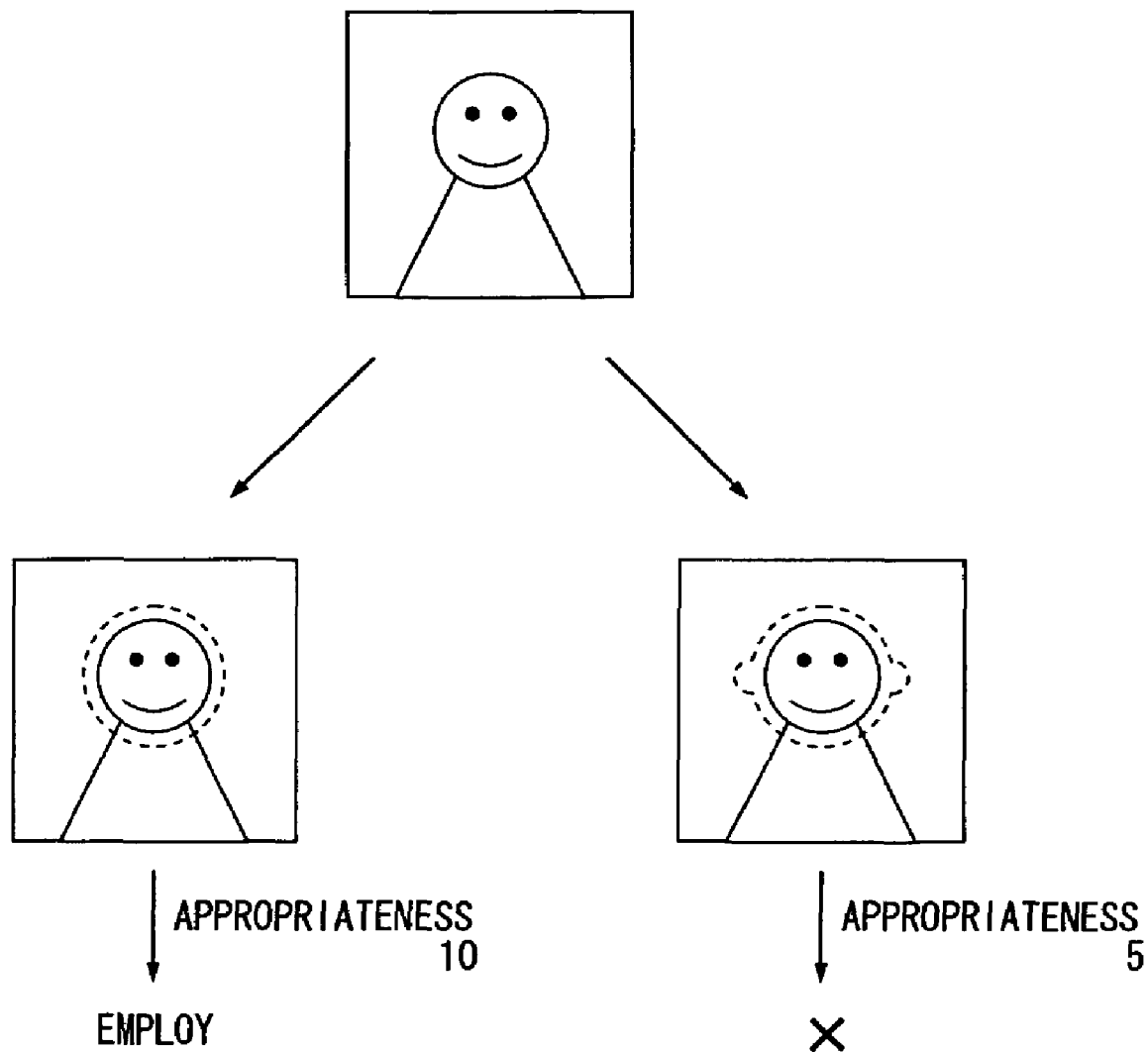
FIG. 3 illustrates using a schematic image the basic idea of mask data creation by the first mask data creating apparatus.

FIG. 1 is a functional block diagram of a first mask data creating apparatus 1A. FIG. 2 is a flow chart showing the flow of operations of the first mask data creating apparatus 1A. FIG. 3 illustrates using a schematic image the basic idea of mask data creation by the first mask data creating apparatus 1A.

The first mask data creating apparatus 1A performs a plurality of types of face image area extraction (partitioning) processing for each of face images included in an input image, and creates, out of a plurality of face image areas respectively obtained by the plurality of types of face image area extraction processing, mask data using the more preferable (more appropriate) face image area.

The first mask data creating apparatus 1A comprises an image data input function 11 for accepting the input of image data, a face detection function 12 for detecting face images on the basis of the inputted image data, first and second face area extraction functions 13 and 14 for respectively extracting face image areas by two different types of extraction processing for each of the detected face images, a appropriateness calculation function 15 for calculating a appropriateness degree (the details of the appropriateness degree will be described later) for each of the face image areas respectively obtained by the two different types of extraction processing, a selection function 16 for selecting either of the first and second face area extraction functions 13 and 14 that has extracted the face image area for which the higher one of the calculated two appropriateness degrees is calculated, and a mask data creation function 17 for creating mask data on the basis of the face image area extracted by the selected one of the first and second face area extraction functions 13 and 14.

Referring to FIGS. 2 and 3, the flow of operations of the first mask data creating apparatus 1A will be described.

Image data is inputted (step 21; image data input function). It is assumed that an image represented by the inputted image data includes one or a plurality of images representing the face of a character.

The image representing the face of the character included in the image represented by the inputted image data is detected (step 22; face detection function). Pattern matching can be utilized for the face detection function.

In a case where a plurality of face images are detected by the face detection function (i.e., a case where a plurality of face images are included in the image represented by the inputted image data), different types of processing, described below, are performed for each of the face images.

A face image area for the detected one face image is extracted (partitioned off) by the first face area extraction function (step 23; first face area extraction function), and a appropriateness degree for the extracted face image area is calculated (step 24; first appropriateness calculation function). In the same manner, a face image area for the detected one face image (the same face image as the face image extracted by the first face image extraction function) is extracted by the second face area extraction function (step 25; second face area extraction function), and a appropriateness degree for the extracted face image area is calculated (step 26; second appropriateness calculation function).

The first face area extraction function 13 and the second face area extraction function 14 respectively extract the face image areas for the same face image by the different types of processing, as described above. Known as face image area extraction processing are (1) area division extraction processing utilizing clustering, (2) edge search extraction processing for searching for an edge radially from the center of a face, (3) labeling extraction processing utilizing the continuity of adjacent pixel values, (4) extraction processing utilizing the continuity of edges in a polar coordinate image, (5) extraction processing utilizing roundness, and so forth. The face image area extraction processing utilizing two of the plurality of types of extraction processing is performed in each of the first face area extraction function 13 and the second face area extraction function 14.

In the first face area extraction function 13 and the second face area extraction function 14, the face image areas are respectively extracted by the different types of extraction processing, as described above. In general, entirely the same areas are not extracted (partitioned off) as the face image areas. As shown in FIG. 3, the face image areas respectively extracted by the two different types of extraction processing are enclosed by broken lines. FIG. 3 shows that the face image areas respectively extracted by the two different types of extraction processing differ in an emphasized manner for easy understanding.

A appropriateness degree calculated by the appropriateness calculation function 15 indicates that the face image area obtained by the two different types of extraction processing is appropriate as a face image area (accuracy, validity, correctness).

The appropriateness degree can be calculated using the roundness of the extracted face image area, for example. The face of the character is substantially elliptical. If the roundness of the extracted face image area is close to the roundness of an ellipse, therefore, a high appropriateness degree is calculated. The farther the roundness of the face image area is apart from the roundness of the ellipse, the lower the calculated appropriateness degree becomes.

In addition to the calculation of the appropriateness degree using the roundness, calculation of a appropriateness degree using a variance, calculation of a appropriateness degree using the shape of skin-colored pixels, and other calculating methods can be also employed.

It is judged which of the calculated two appropriateness degrees is higher (step 27; selection function). Mask data is created on the basis of the face image area (the range and the position of the face image area in the input image) obtained by the face image area extraction processing in which the higher appropriateness degree is obtained (step 28; mask data creation function).

The above-mentioned operations are repeated for the remaining detected faces (NO in step 29). When the above-mentioned operations for all the detected faces are terminated, the operations of the first mask data creating apparatus 1A are terminated (YES in step 29).

As described in the foregoing, the face image area extraction processing in each of the first face area extraction function 13 and the second face area extraction function 14 is performed for each of the detected face images in the input image. For each of the face images, mask data (individual mask data) based on the face image area extracted by either one of the first and second face area extraction functions 13 and 14 is created. The entire mask data finally created in a case where the plurality of face images are detected may, in some cases, include only the individual mask data created by the face image area extracted by the first face area extraction function 13, or may, in some cases, include the individual mask data created by the face image area extracted by the second face area extraction function 14. Of course, the entire mask data may, in some cases, include both the individual mask data created by the face image area extracted by the first face area extraction function 13 and the individual mask data created by the face image area extracted by the second face area extraction function 14.

(ii) Second Mask Data Creating Apparatus

Figure 4:
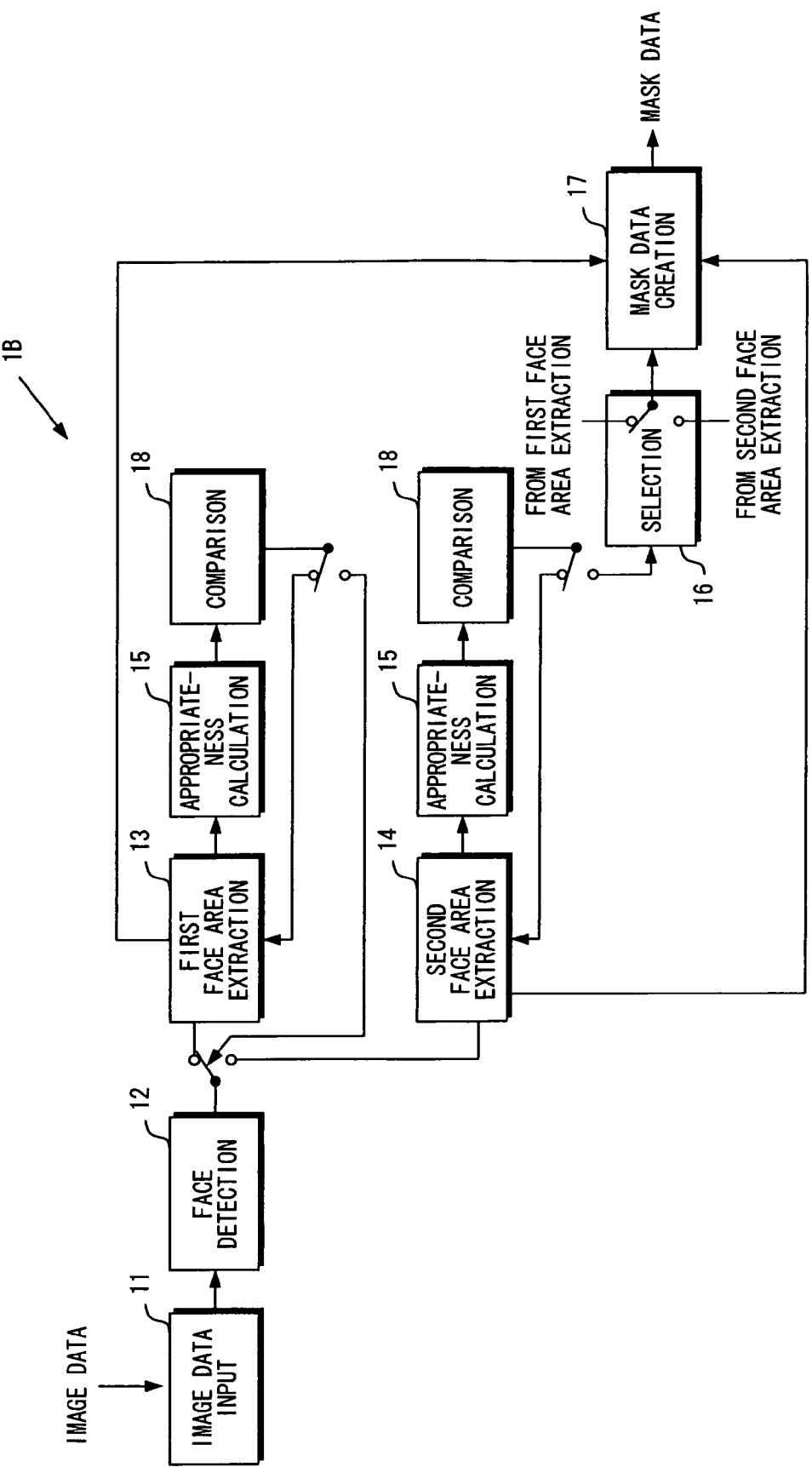
FIG. 4 is a functional block diagram of a second mask data creating apparatus.
Figure 5:
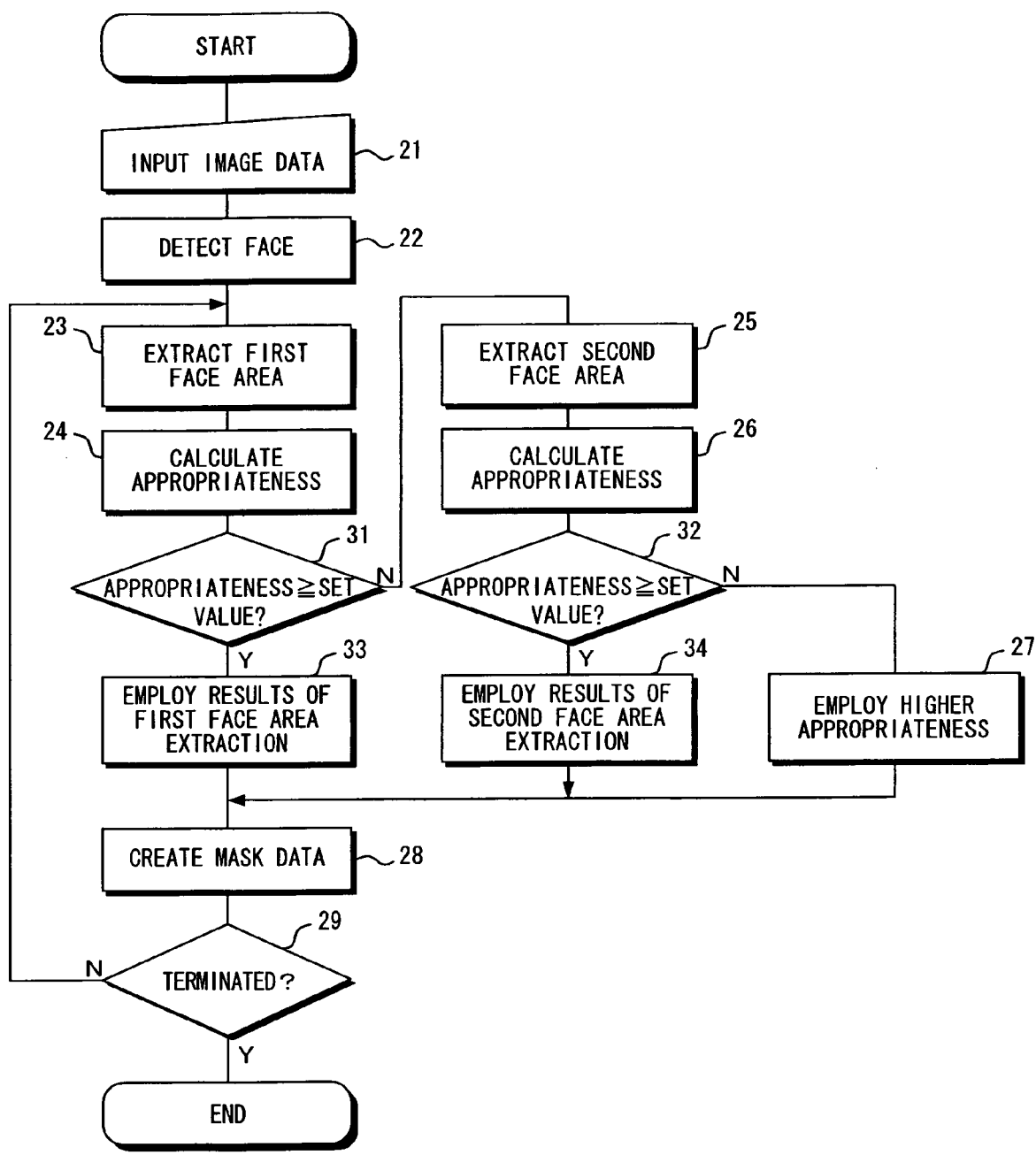
FIG. 5 is a flow chart showing the flow of operations of the second mask data creating apparatus.
Figure 6:
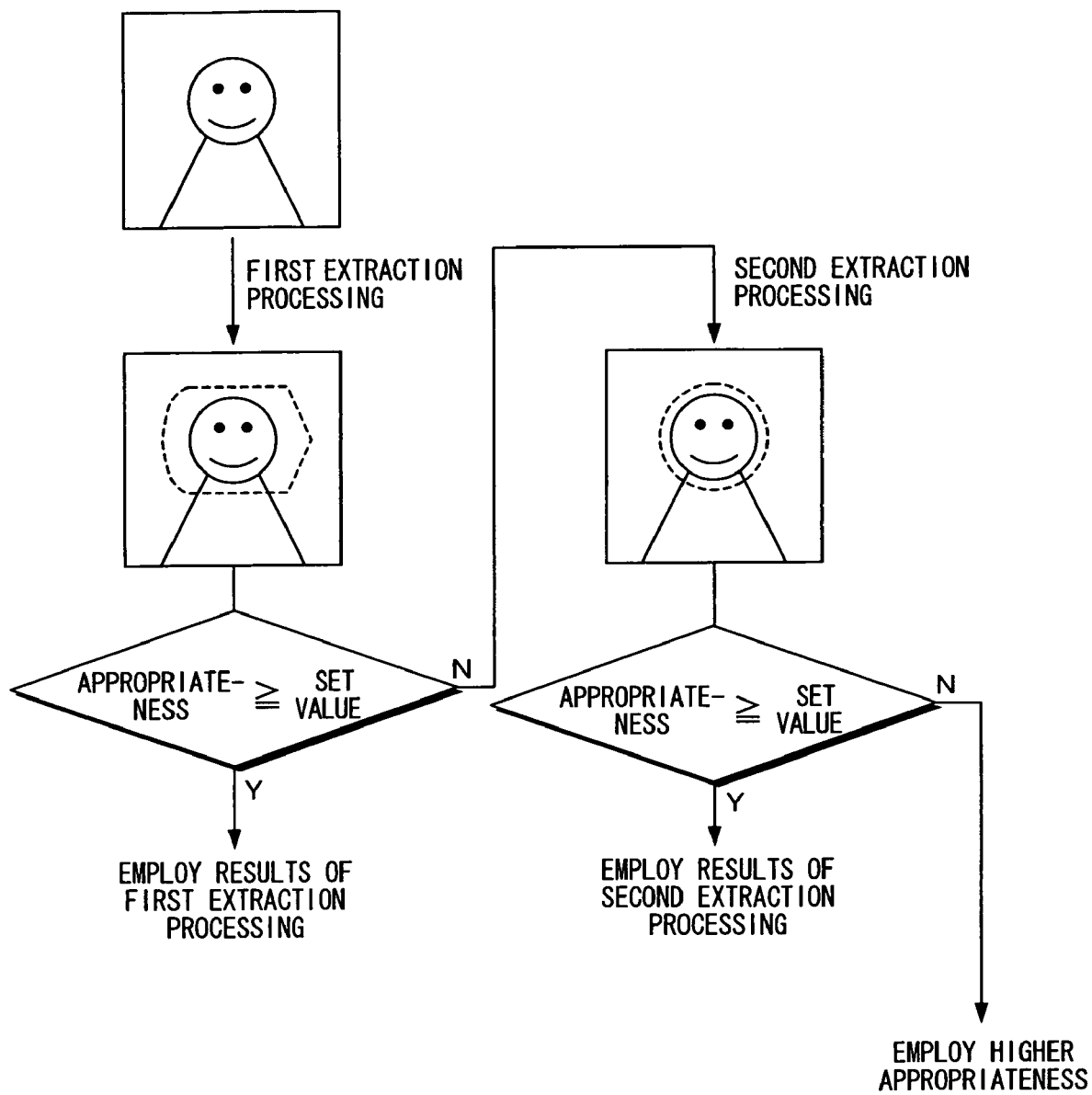
FIG. 6 illustrates using a schematic image the basic idea of mask data creation by the second mask data creating apparatus.

FIG. 4 is a functional block diagram of a second mask data creating apparatus 1B. FIG. 5 is a flow chart showing the flow of operations of the second mask data creating apparatus 1B. FIG. 6 illustrates using a schematic image the basic idea of mask data creation by the second mask data creating apparatus 1B.

The second mask data creating apparatus 1B is the same as the first mask data creating apparatus 1A in that a plurality of types of face image area extraction processing can be performed, but differs therefrom in the processing procedure. In the second mask data creating apparatus 1B, each of the plurality of types of face image area extraction processing is controlled such that in a case where a appropriateness degree for a face image area obtained by the one face image area extraction processing is less than a predetermined value, the face image area is extracted by the other face image area extraction processing. In the functional block diagram of the second mask data creating apparatus 1B shown in FIG. 4, blocks having the same functions as those in the functional block diagram of the first mask data creating apparatus 1A shown in FIG. 1 are assigned the same reference numerals and thence, the overlapped description is avoided. In the flow chart shown in FIG. 5, the same operations as those in the flow chart shown in FIG. 2 are assigned the same reference numerals and hence, the overlapped description is avoided.

In the second mask data creating apparatus 1B, face image area extraction processing is first performed by a first face area extraction function 13 so that a appropriateness degree is calculated (steps 23 and 24).

The calculated appropriateness degree is compared with a predetermined value (a previously set value, which may be of course set by an operator) (step 31; comparison function 18).

In a case where the calculated appropriateness degree is not less than the predetermined value (or a case where the appropriateness degree exceeds the predetermined value) (YES in step 31), the face image area extracted by the first face area extraction function 13 is used so that individual mask data is created (steps 33 and 28). Processing for the detected one face image is terminated.

In a case where the calculated appropriateness degree is less than the predetermined value (or not more than the predetermined value) (NO in step 31), face image area extraction processing is performed by a second face area extraction function 14 (step 25). A appropriateness degree is calculated (step 26), and the appropriateness degree and the predetermined value are compared with each other (step 32; comparison function 18). When the calculated appropriateness degree is not less than the predetermined value, the face image area extracted by the second face area extraction function 14 is used so that individual mask data is created (YES in step 32, steps 34 and 28).

When both the respective two appropriateness degrees for the face image areas extracted by the first and second face area extraction functions 13 and 14 for the detected one face image are less than the predetermined value (NO in step 32), mask data is created on the basis of the face image area obtained by the face area extraction function, in which the higher appropriateness degree is obtained, out of the first and second face area extraction functions 13 and 14, as in the first mask data creating apparatus 1A (steps 27 and 28).

(iii) Third Mask Data Creating Apparatus

Figure 7:
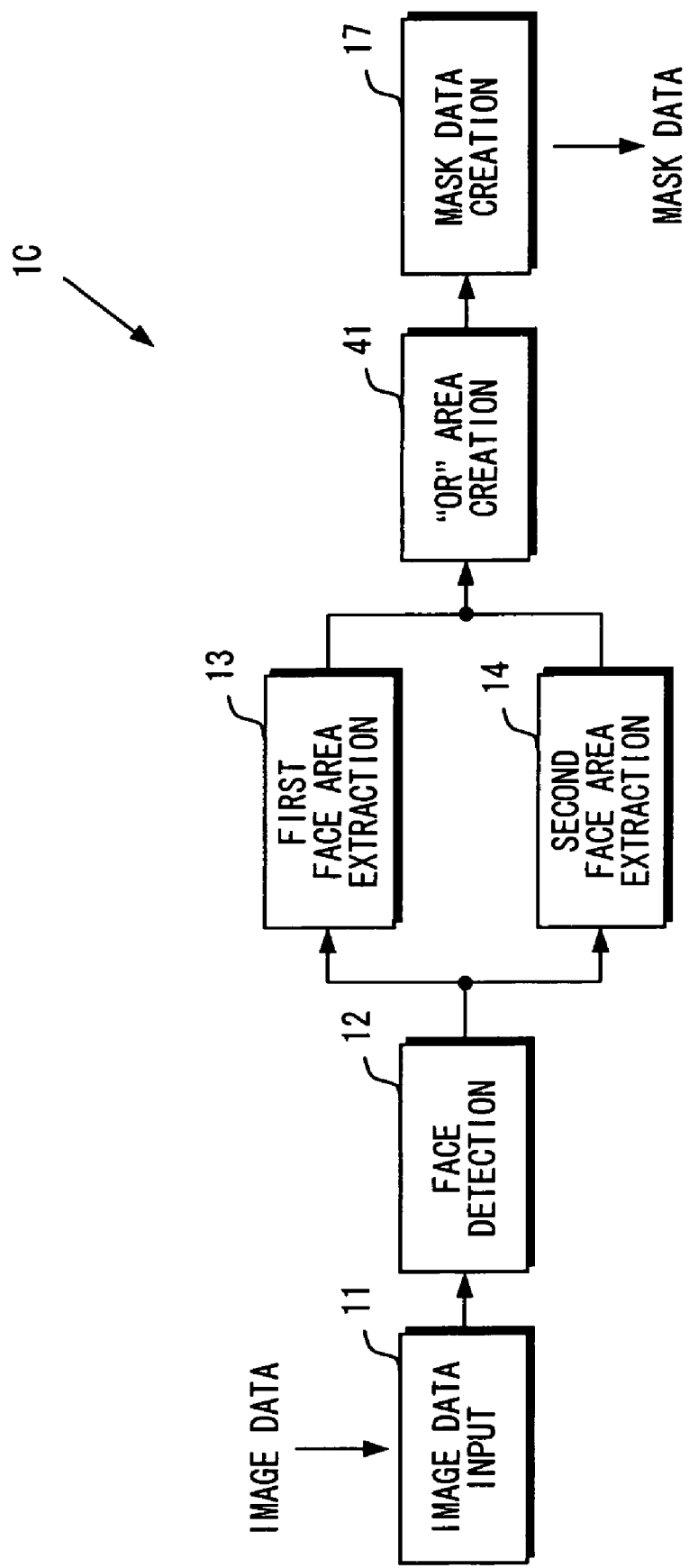
FIG. 7 is a functional block diagram of a third mask data creating apparatus.
Figure 8:
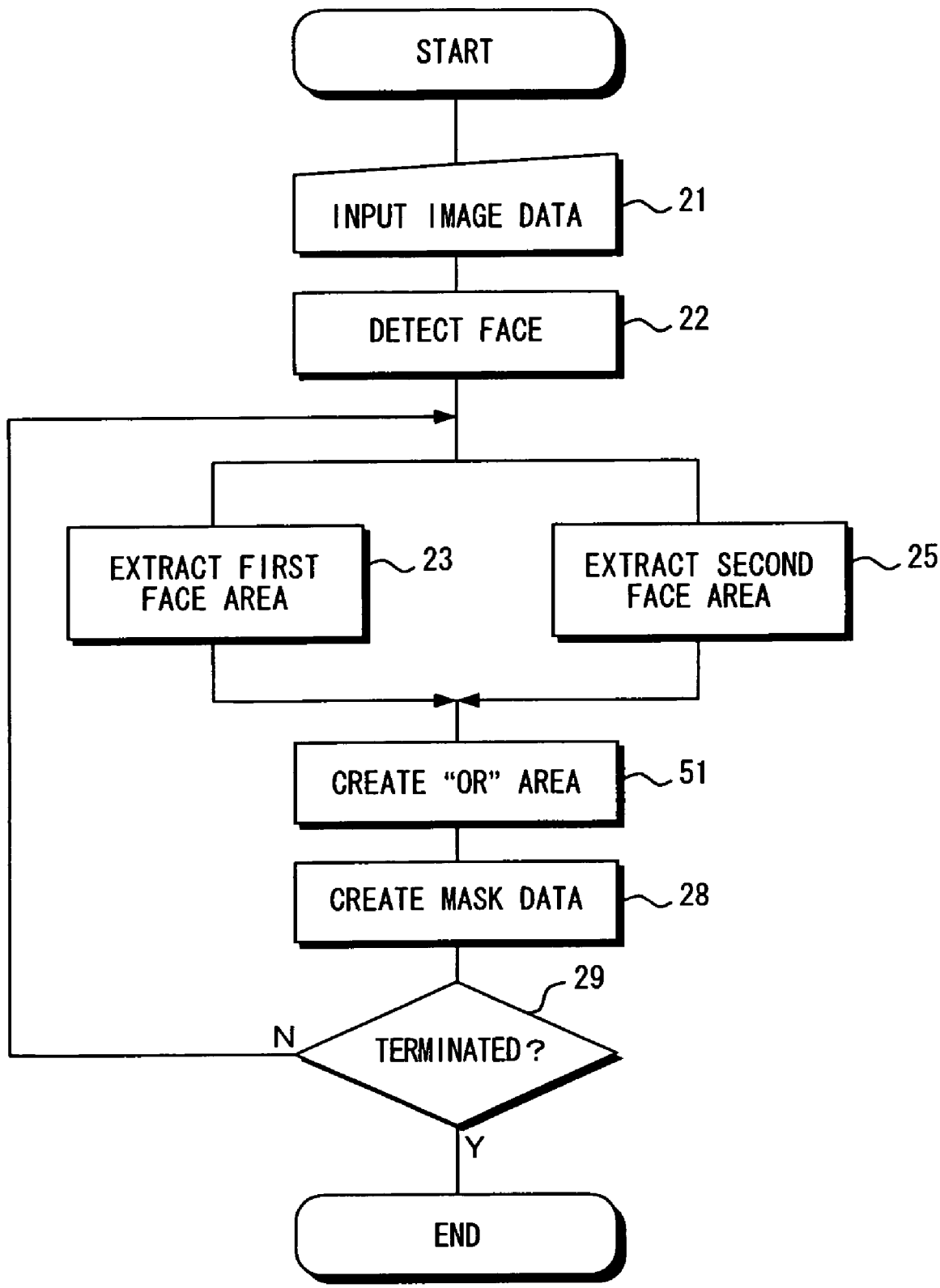
FIG. 8 is a flow chart showing the flow of operations of the third mask data creating apparatus.
Figure 9:
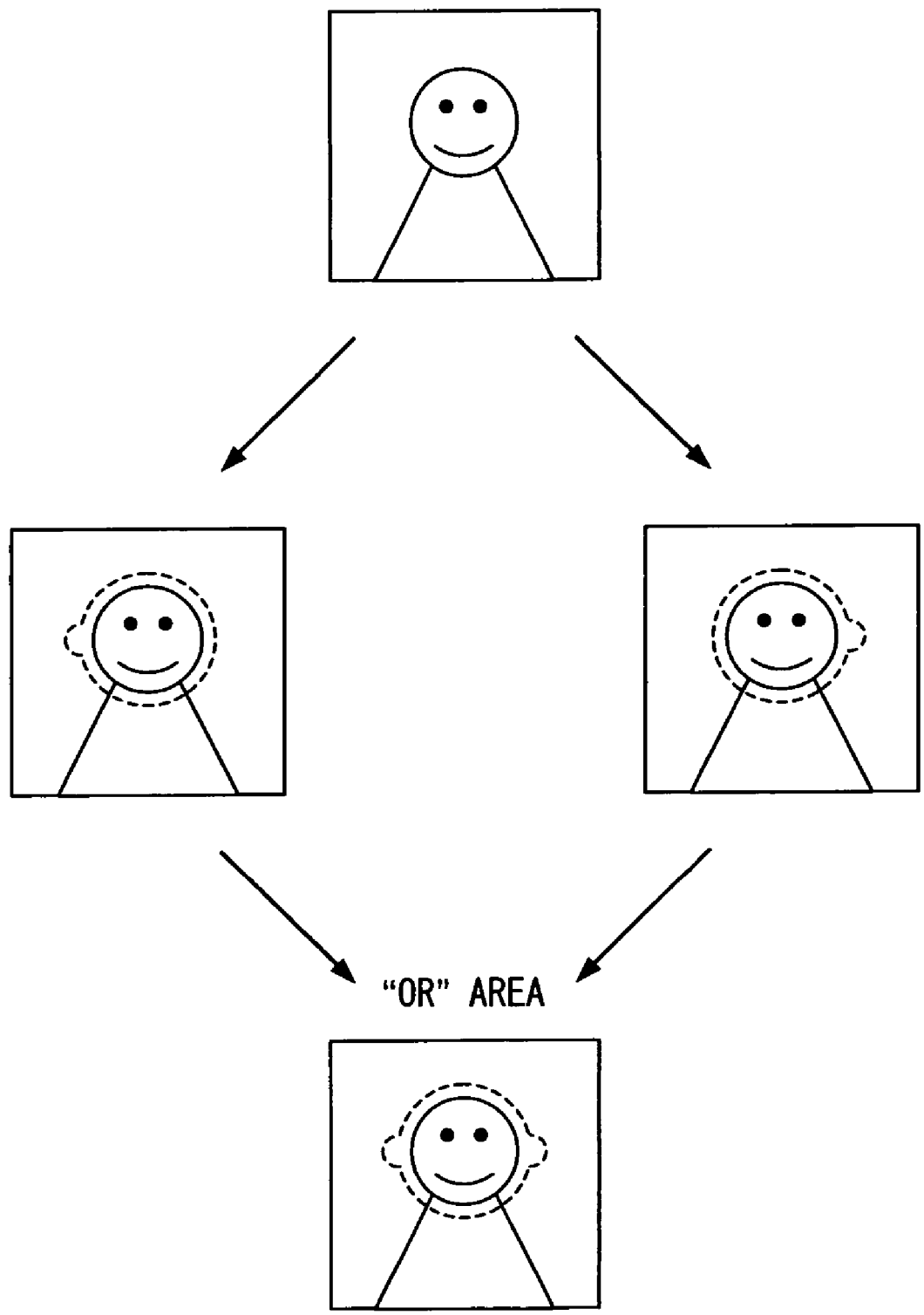
FIG. 9 illustrates using a schematic image the basic idea of mask data creation by the third mask data creating apparatus.

FIG. 7 is a functional block diagram of a third mask data creating apparatus 1C. FIG. 8 is a flow chart showing the flow of operations of the third mask data creating apparatus 1C. FIG. 9 illustrates using a schematic image the basic idea of mask data creation by the third mask data creating apparatus 1C.

The third mask data creating apparatus 1C is the same as the first mask data creating apparatus 1A in that a plurality of types of face image area extraction processing are performed, but differs therefrom in an area used for creating mask data. That is, in the first mask data creating apparatus 1A, individual mask data is created using the face image area extracted by any one of the plurality of types of face image area extraction processing. On the other hand, in the third mask data creating apparatus 1C, an OR area of all the results of the plurality of types of face image area extraction processing is created, and individual mask data is created on the basis of the OR area. In the functional block diagram of the third mask data creating apparatus 1C shown in FIG. 7, blocks having the same functions as those in the functional block diagram of the first mask data creating apparatus 1A shown in FIG. 1 are assigned the same reference numerals and hence, the overlapped description is avoided. In the flow chart shown in FIG. 8, the same operations as those in the flow chart shown in FIG. 2 are assigned the same reference numerals and hence, the overlapped description is avoided.

In a first face area extraction function 13 and a second face area extraction function 14, face image areas are respectively extracted for one face image, and an OR area based on the extracted two face image areas is created (step 51; OR area creation function 41). Individual mask data is created on the basis of the OR area (step 28).

Logical add processing of the two face image areas in the OR area creation function 41 is for creating an OR area of the face image area extracted by the first face area extraction function 13 and the face image area extracted by the second face area extraction function 14. Therefore, the OR area may, in some cases, be the same as the face image area extracted by the first face area extraction function 13 (a case where the face image area extracted by the second face area extraction function 14 is included in the face image area extracted by the first face area extraction function 13), or may, in some cases, be the same as the face image area extracted by the second face area extraction function 14 (a case where the face image area extracted by the first face area extraction function 13 is included in the face image area extracted by the second face area extraction function 14). There is also a case where the OR area is an area obtained by incorporating the face image area extracted by the first face area extraction function 13 and the face image area extracted by the second face area extraction function 14 with each other (a case where the face image area extracted by the first face area extraction function 13 and the face image area extracted by the second face area extraction function 14 are not in an inclusive relationship) (see FIG. 9)

(iv) Fourth Mask Data Creating Apparatus

Figure 10:
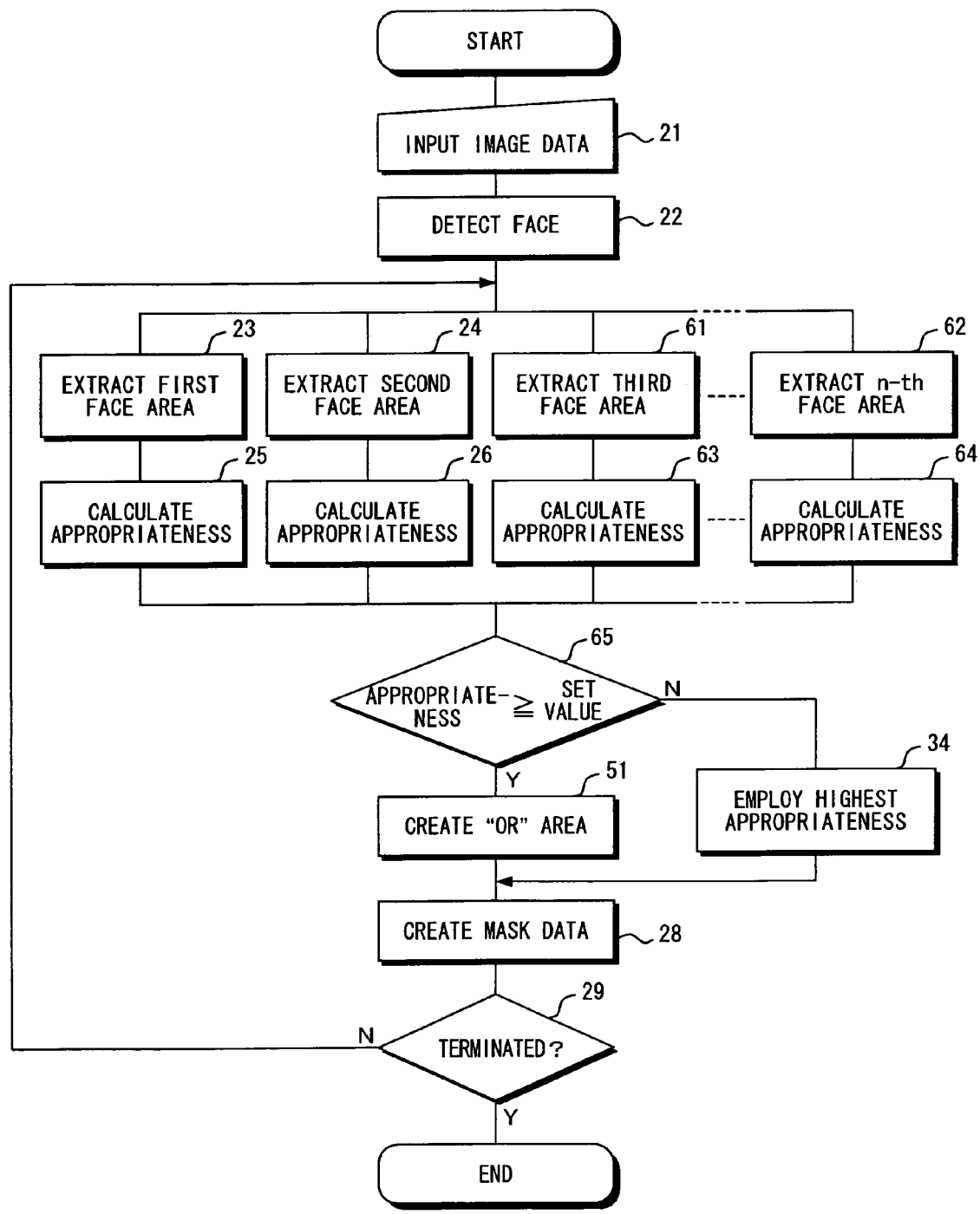
FIG. 10 is a flow chart showing the flow of operations of a fourth mask data creating apparatus.
Figure 11:
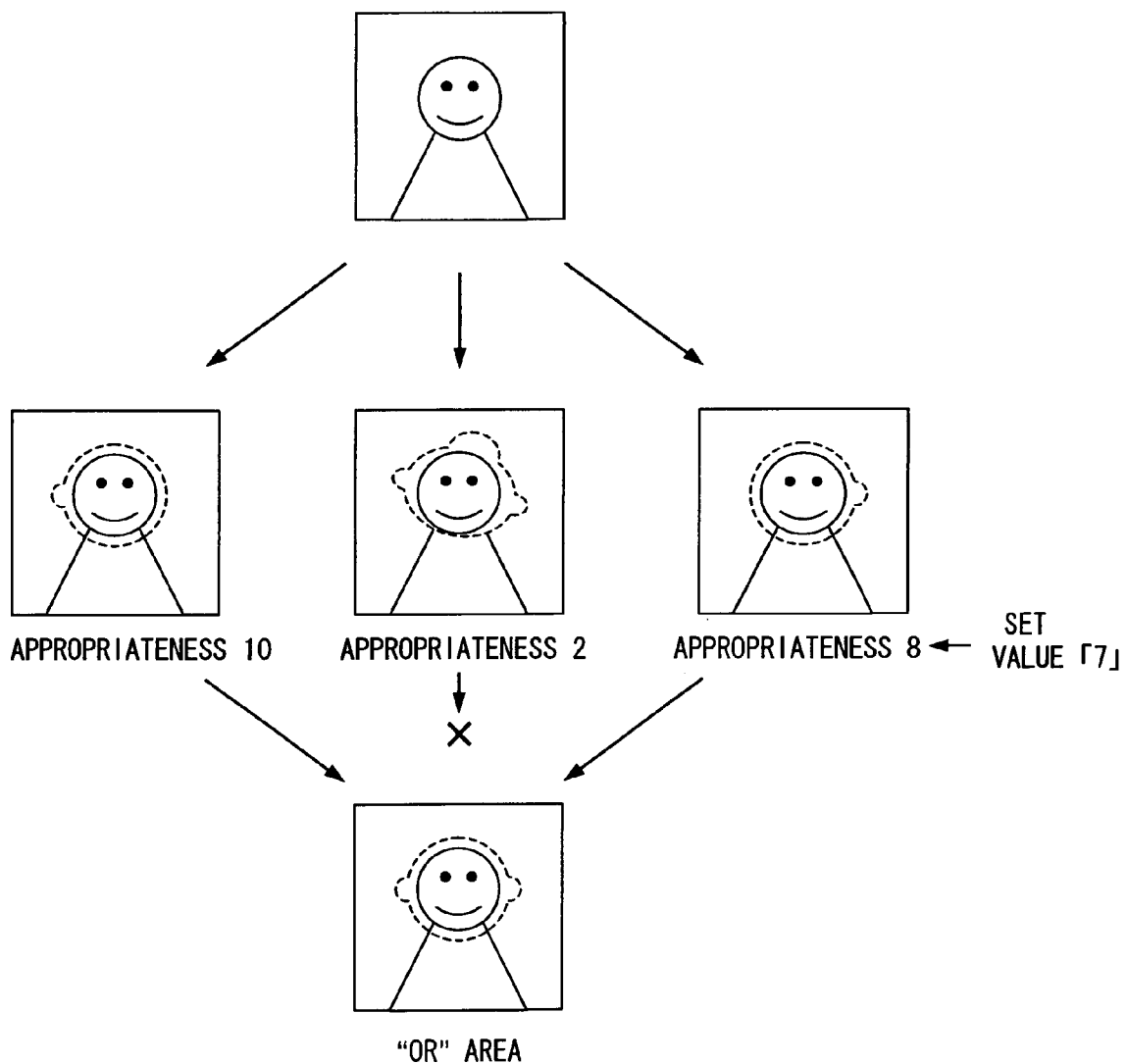
FIG. 11 illustrates using a schematic image the basic idea of mask data creation by the fourth mask data creating apparatus.

FIG. 10 is a flow chart showing the flow of operations of a fourth mask data creating apparatus 1D. FIG. 11 illustrates using a schematic image the basic idea of mask data creation by the fourth mask data creating apparatus 1D.

Simply stated, the fourth mask data creating apparatus 1D is a combination of the first mask data creating apparatus 1A (FIGS. 1 to 3) and the third mask data creating apparatus 1C (FIGS. 7 to 9). In the flow chart shown in FIG. 10, the same operations as those in the flow chart shown in FIG. 8 are assigned the same reference numerals and hence, the overlapped description is avoided. A functional block diagram of the fourth mask data creating apparatus 1D is omitted.

In the fourth mask data creating apparatus 1D, a plurality of types of face image area extraction processing are performed for a detected one face (steps 23, 24, 61, and 62; first to n-th types of face image area extraction processing), and a appropriateness degree for each of face image areas respectively obtained by the plurality of types of extraction processing is calculated in the same manner as in the first mask data creating apparatus 1A (steps 25, 26, 63, and 64).

It is judged whether or not each of the calculated plurality of appropriateness degrees is not less than a set value (predetermined value) (step 65). If one or more of the appropriateness degrees are not less than the predetermined value, face image areas respectively obtained by the extraction processing in which the appropriateness degrees are obtained are used, to create an OR area, as in the third mask data creating apparatus 1C (step 51; see FIG. 11). Individual mask data is created on the basis of the OR area (step 28). If one of the calculated plurality of appropriateness degrees is not less than the predetermined value, individual mask data is created on the basis of the face image area obtained by the one extraction processing in which the appropriateness degree is obtained.

When all the appropriateness degrees for the face image areas respectively obtained by the plurality of types of extraction processing are less than the predetermined value (NO in step 65), individual mask data is created on the basis of the face image area obtained by the extraction processing in which the highest appropriateness degree is obtained, as in the first mask data creating apparatus 1A (steps 34 and 28).

(v) Modified Example

Figure 12:
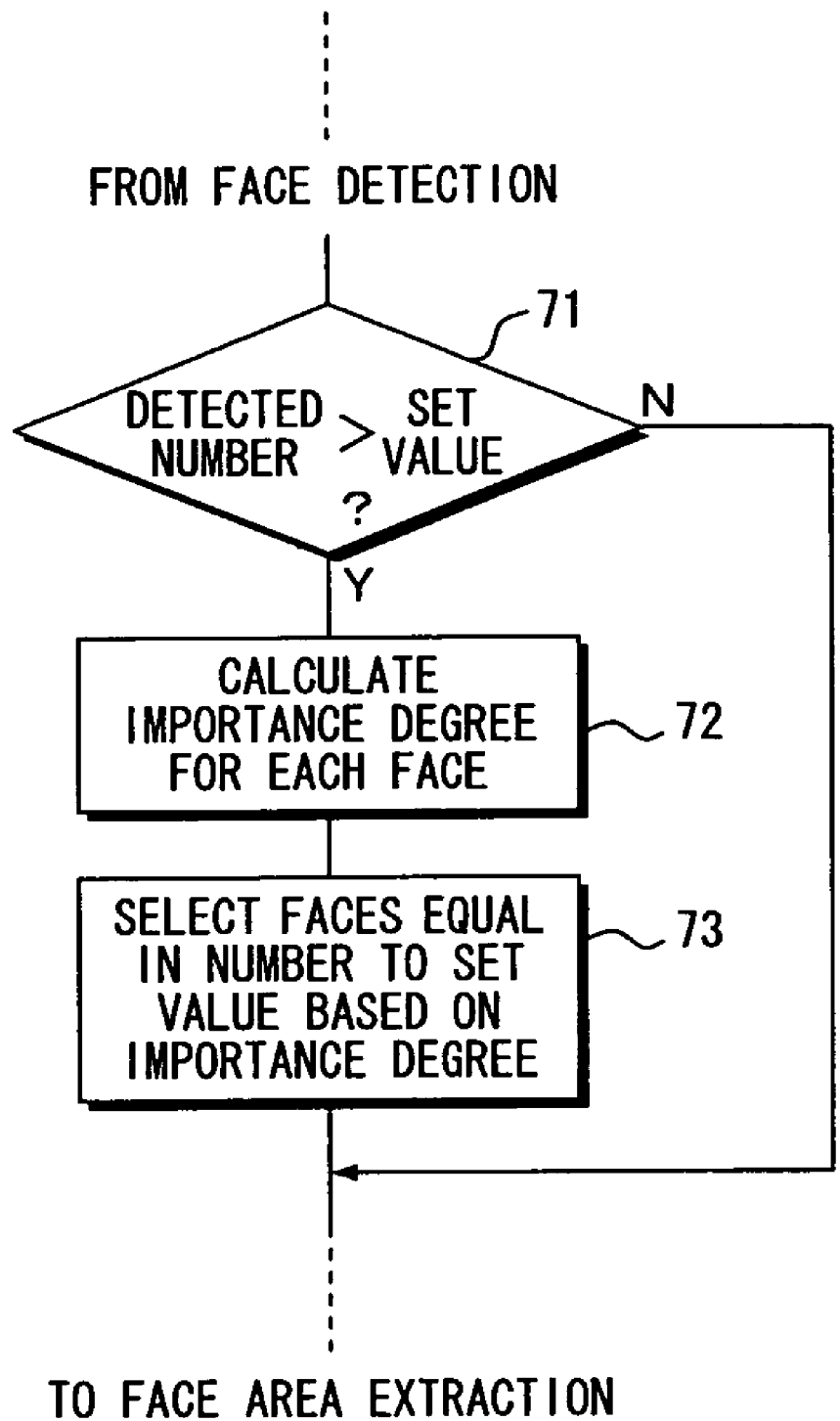
FIG. 12 is a flow chart showing the flow of additional operations of the mask data creating apparatus, which are applicable to any of the first to fourth mask data creating apparatuses.
Figure 13:
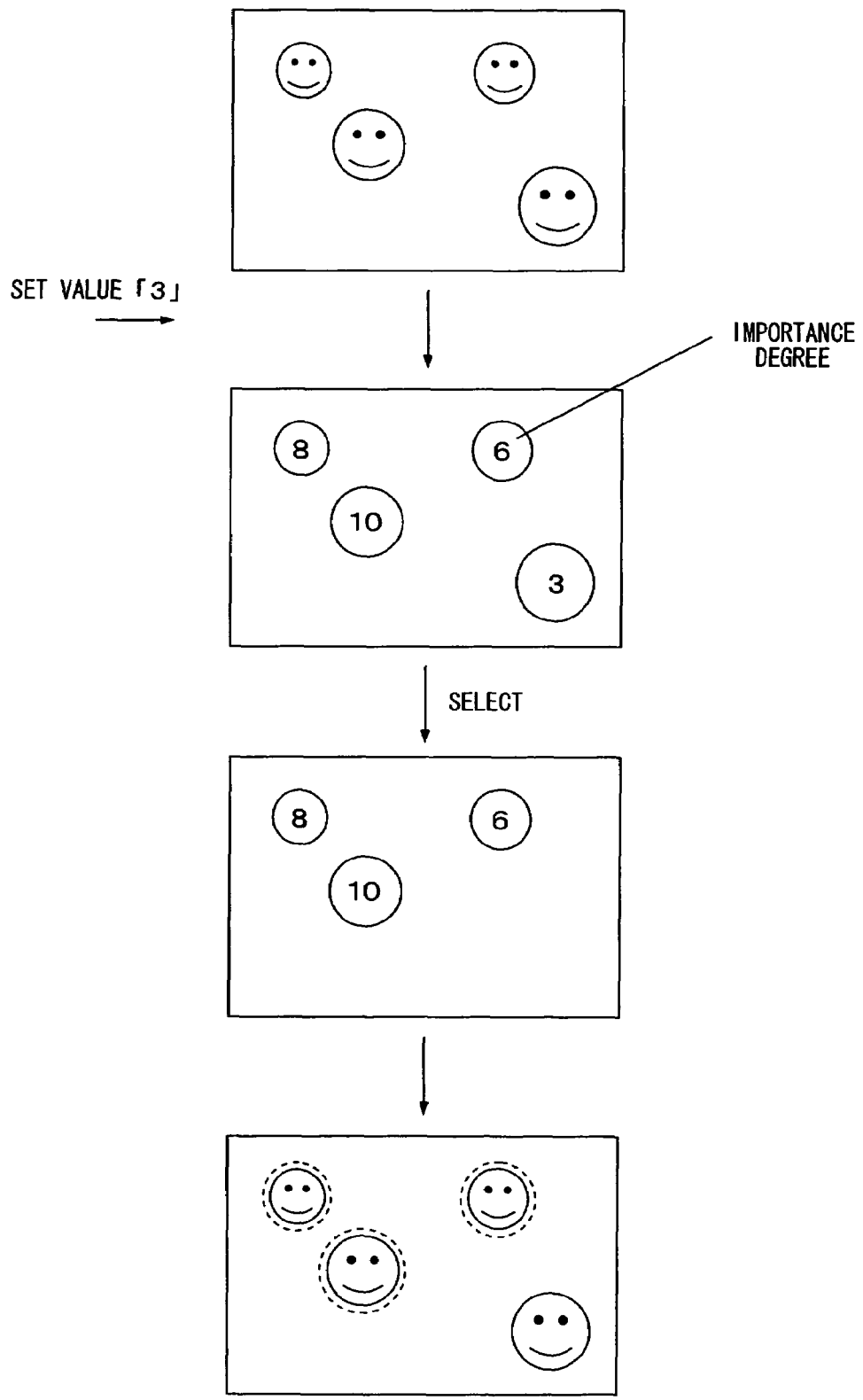
FIG. 13 illustrates using a schematic image the basic idea of additional operations of the mask data creating apparatus.

FIG. 12 is a flow chart showing the flow of additional operations of the mask data creating apparatus, which is applicable to any one of the first to fourth mask data creating apparatuses 1A to 1D. FIG. 13 illustrates using a schematic image the basic idea of the operations shown in FIG. 12.

The operations in the flow chart shown in FIG. 12 are operations for selecting, when a large number of face images are included in an image represented by inputted image data (an input image) from which mask data should be created, the face image, which should be subjected to face image area extraction processing, is selected out of the large number of face images. In the flow charts (FIGS. 2, 5, 8, and 10) respectively showing the flows of the operations of the first to fourth mask data creating apparatuses 1A to 1D, the operations in the flow chart shown in FIG. 12 can be added between the face detection processing (step 22) and the face image area extraction processing (steps 23, 24, etc.).

When a plurality of face images are detected in the face detection processing (step 12), the number of the detected face images and a set value are compared with each other. The set value may be a previously determined numerical value or a numerical value set by an operator.

When the number of the detected face images is not more than the set value, no special processing is performed (NO in step 71). The procedure proceeds to the face image area extraction processing.

When the number of the detected face images exceeds the set value (YES in step 71), an importance degree is calculated for each of the detected face images (step 72).

The position of the detected face image, for example, can be used for calculating the importance degree. This is based on such an empirical rule that in a case where a plurality of face images are included in an input image, the closer the face image is positioned to the center of the input image, the more important (significant) the face image is in many cases. In this case, the distances from the position at the center of the input image to the positions of the detected plurality of face images are respectively calculated. The shorter the distance is, the higher the importance degree to be assigned to the face image is (see FIG. 13).

In addition to the calculation of the importance degree using the distance, the importance degree may be calculated (determined) for each of the detected face images using the size, the inclination, the matching score obtained by pattern matching, and others of the face image.

Out of the plurality of face images, the predetermined number of face images are selected on the basis of the importance degrees respectively calculated for the plurality of face images (step 73). The face image area extraction processing is performed for each of the selected predetermined number of face images.

Figure 14:
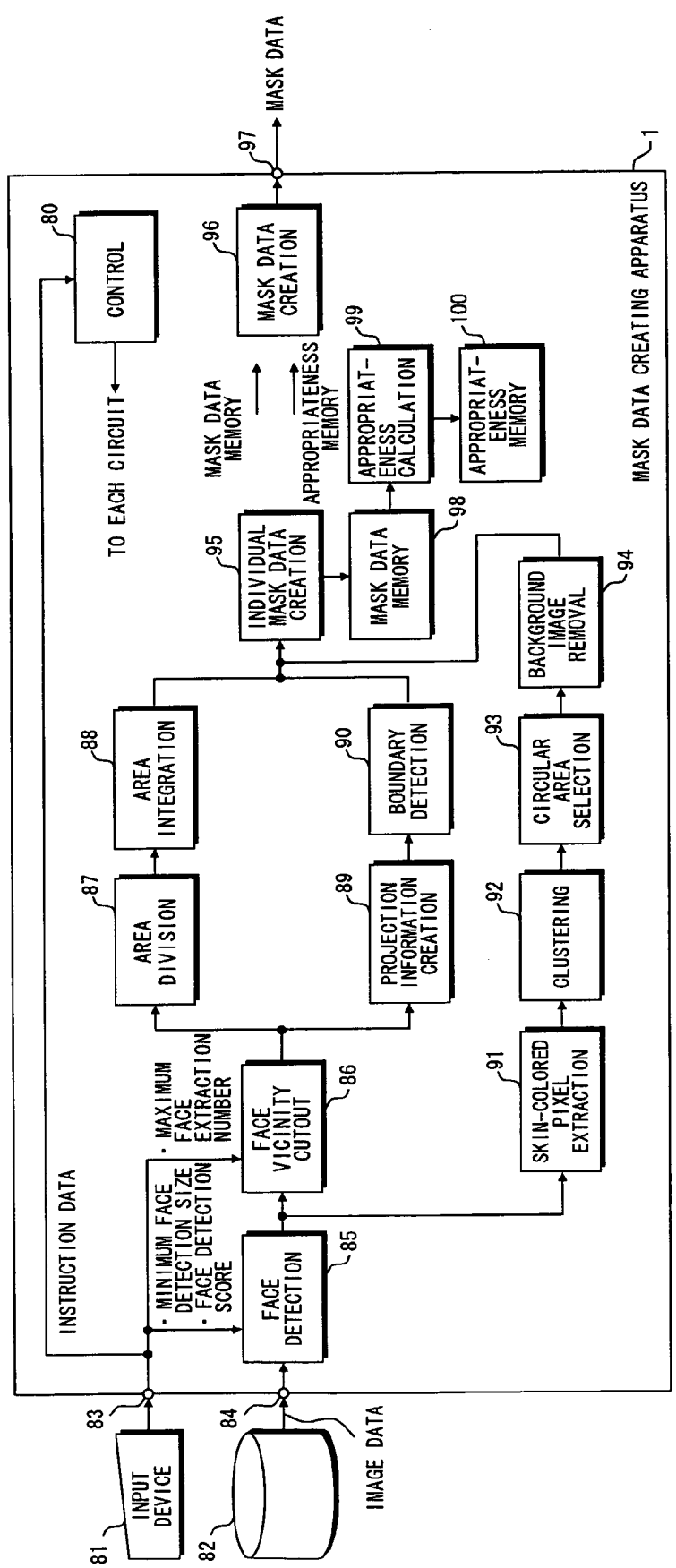
FIG. 14 is a block diagram showing the specific electrical configuration of the mask data creating apparatus.

FIG. 14 is a block diagram showing the specific electrical configuration of the mask data creating apparatus 1.

The mask data creating apparatus 1 also functions as the first to fourth mask data creating apparatuses (including the modified example) 1A to 1D. It is determined (controlled) by a control circuit 80 included in the mask data creating apparatus 1 which of the first to fourth mask data creating apparatuses 1A to 1D operates the mask data creating apparatus 1.

Instruction data indicating which of the first to fourth mask data creating apparatuses 1A to 1D operates the mask data creating apparatus 1 is inputted from an input device (a keyboard, a mouse, etc.) 81 connected to the mask data creating apparatus 1. The instruction data inputted from the input device 81 is given to the control circuit 80. The control circuit 80 carries out control in accordance with the instruction data such that the mask data creating apparatus 1 is operated by any one of the first to fourth mask data creating apparatuses 1A to 1D.

A minimum face detection size, a face detection score, a maximum face extraction number are also inputted from the input device 81.

The minimum face detection size represents the size of the minimum face image to be detected in face detection processing. The minimum face detection size is inputted (designated) depending on its ratio to the number of pixels (the number of pixels in the vertical direction and the number of pixels in the horizontal direction) or the size of an image represented by inputted image data (an input image).

In the face detection processing described below, face detection is performed by pattern matching. When a matching score obtained by pattern matching is not more than a predetermined value, it is judged that a face image is detected. The face detection score represents the predetermined value (the minimum value of the matching score by which it is judged that the face image is detected).

The maximum face extraction number is used for selecting, when a plurality of face images exists in the input image, the face image to be extracted out of the detected face images. When the input image includes the face images whose number is more than the maximum face extraction number, the face images corresponding to the maximum face extraction number are selected out of the face images, and the selected face images are subjected to face image area extraction processing.

The minimum face detection size and the face detection score that are inputted from the input device 81 are given to a face detection circuit 85, described later, through an input terminal (an interface) 83. The maximum face extraction number is given to a face vicinity area cutout circuit 86, described later.

The minimum face detection size, the face detection score, the maximum face extraction number affect the precisions and the processing speeds of face detection processing and face extraction processing. The processing speed of the face detection processing becomes high when the minimum face detection size is large, while the precision of the face detection processing becomes high when it is small. The processing speed of the face detection processing becomes high when the face detection score is high, while the precision of the face detection processing becomes high when it is low. A large number of face images are extracted in a case where they are included in the input image when the maximum face extraction number is large, while the processing speed of the face extraction processing becomes high when it is small.

Image data representing an image including a face image read out of a storage device 82 (a hard disk, a flexible disk, a CD-ROM, a memory card, etc.) is inputted to a face detection circuit 85 through an input terminal (an interface) 84.

The face detecting circuit 85 detects an image representing the face of a character (a face image) included in an image represented by inputted image data (an input image) by pattern matching. When a matching score of not less than the above-mentioned face detection score is obtained, the face detection circuit 85 detects that the face image is included in the input image. Further, the face image of a smaller size than the minimum face detection size is not handled as the detected face image even if the matching score is not less than the face detection score.

In the mask data creating apparatus 1, three different types of face image area extraction processing can be performed.

The first extraction processing is extraction processing performed by a face vicinity cutout circuit 86, an area division circuit 87, and an area integration circuit 88, which is hereinafter referred to as area division extraction processing.

The second extraction processing is extraction processing performed by the face vicinity cutout circuit 86, a projection information creation circuit 89, and a boundary detection circuit 90, which is hereinafter referred to as edge search extraction processing.

The third extraction processing is extraction processing performed by a skin-colored pixel extraction circuit 91, a clustering circuit 92, a circular area selection circuit 93, and a background image removal circuit 94, which is hereinafter referred to as roundness utilization extraction processing.

All the three types of extraction processing are performed for each of the detected face images included in the input image.

First, the area division extraction processing will be described.

Figure 19:
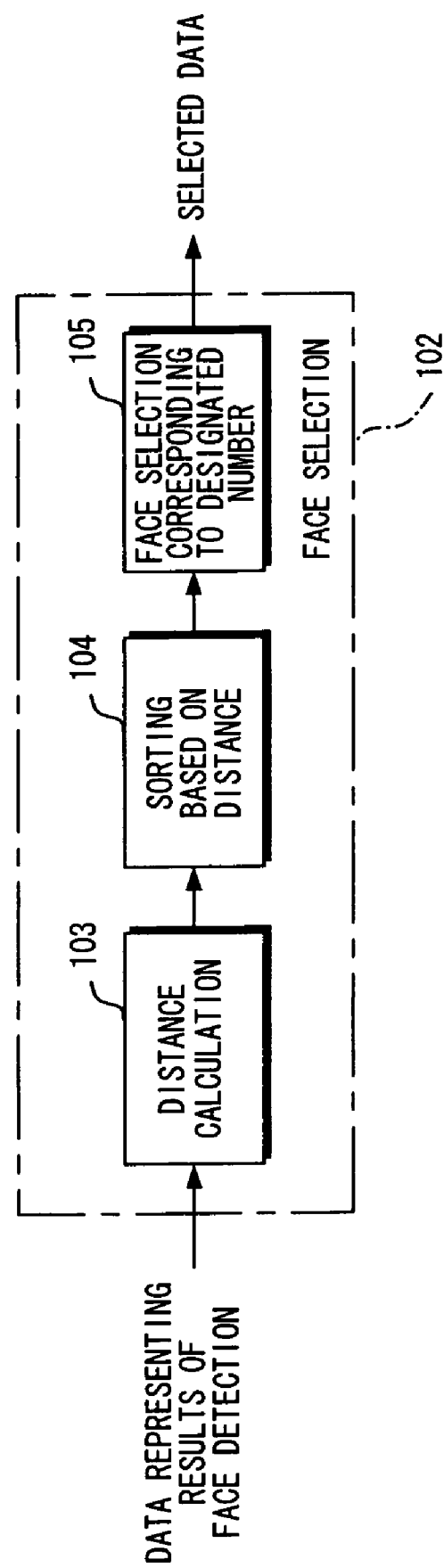
FIG. 19 is a functional block diagram of face selection processing.

In the area division extraction processing, processing in the face vicinity cutout circuit 86 is first performed. When the input image exists a plurality of face images, and the number of the face images exceeds the above-mentioned maximum face extraction number (a designated number), the above-mentioned face selection processing based on importance degrees is performed prior to cutout processing, described below, in the face vicinity cutout circuit 86. An example of a functional block diagram of a face selection function 102 is shown in FIG. 19.

The face detection circuit 85 detects the face image included in the input image by pattern matching, and data outputted therefrom (face detection output data) includes data representing the approximate center of the detected face image (e.g., relative coordinates). For each of all faces detected by the face detection circuit 85, the distance from the center of the input image to the center of the face is calculated (a distance calculation function 103). The calculated distance is used as a value representing an importance degree.

Information for specifying the detected faces are sorted in ascending order of calculated distances from the center of the input image (a sorting function 104 based on distances) The face specifying information corresponding to the designated number are selected (face selection functions 105 corresponding to the designated number) on the basis of the face specifying information arranged in ascending order of distances from the center of the input image. The procedure proceeds to processing for the face images specified by the selected face specifying information corresponding to the designated number.

In the above-mentioned face selection processing, the face image that is at a short distance from the center of the input image, that is, the face image having a low importance degree is used as an object of face image area extraction processing. Of course, the inverse of the distance from the center of the input image may be calculated and used as an importance degree. In this case, the face images that should be used as an object of face image area extraction processing are selected in descending order of their importance degrees.

Figure 16A:
FIGS. 16A and 16B respectively illustrate an example of an input image and an example of rectangular areas partitioned off from the input image.
Figure 16B:
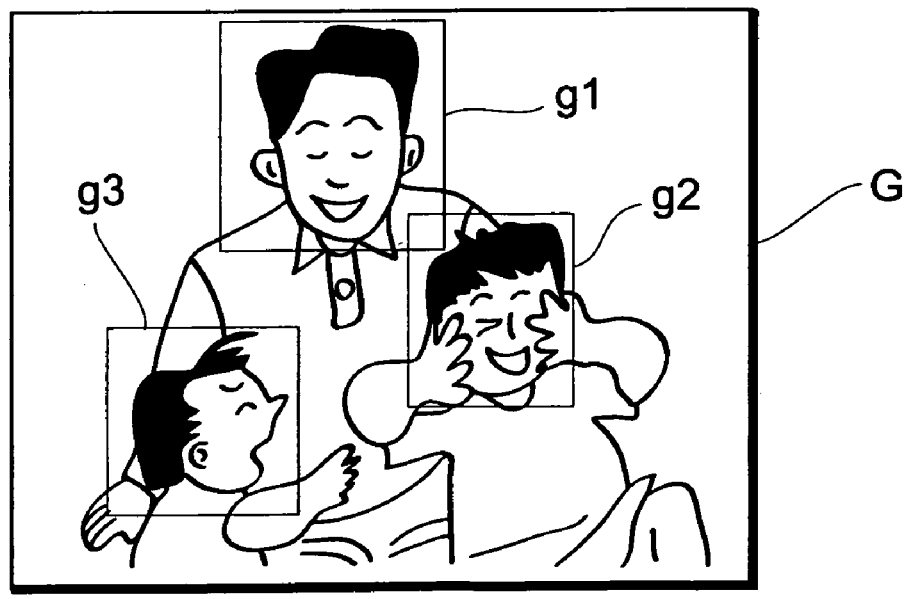

Returning to FIG. 14, a rectangular area including the face image included in the input image is cut out (partitioned off) by the face vicinity cutout circuit 86. The shape and the size of the rectangular area cut out are based on a pattern used in pattern matching in the face detection circuit 85. FIG. 16A illustrates an example of an input image G, and FIG. 16B illustrates an example of rectangular areas g1, g2, and g3 cut out from the input image G.

In the area division circuit 87, processing for converting color data (RGB) relating to pixels in similar colors into a predetermined value is then performed using the rectangular areas cut out by the face vicinity cutout circuit 86 as a processing object. Consequently, image data obtained by respectively clustering pixels having color data in a skin color and a color close to the skin color, pixels having color data in a white color and a color close to the white color, pixels having color data in a black color and a color close to the black color, and so forth is created.

Furthermore, in the area integration circuit 88, portions where no edges exist are integrated, to create image data (face image area data) obtained by the integration. The face image area data includes data representing the position and the range of the face image area in the input image.

The face image area data outputted from the area integration circuit 88 is given to an individual mask data creation circuit 95.

Figure 17A:
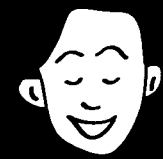
FIGS. 17A to 17C respectively illustrate images represented by individual mask data.
Figure 17B:
Figure 17C:

The individual mask data creation circuit 95 creates image data (individual mask data) representing an image in which a portion in a color similar to a skin color (a face area) and a portion in a color similar to the other color are distinguished in an image represented by the face image area data outputted from the area integration circuit 88. Examples of the image represented by the individual mask data are illustrated in FIGS. 17A to 17C.

In the above-mentioned manner, the individual mask data created on the basis of the face image area extracted by the area division extraction processing is temporarily stored in a mask data memory 98.

The edge search extraction processing will be then described.

In the edge search extraction processing, projection information is created in the projection information creation circuit 89 with respect to the rectangular area including the face image cut out by the face vicinity cutout circuit 86. The projection information respectively mean edge information for directions (e.g., 64 directions) toward the periphery of the face image from the center of the face image (the approximate center of the face image detected by pattern matching in the face detection circuit 85 is detected).

The boundary detection circuit 90 detects an edge between the face image and an image surrounding the face image on the basis of the projection information created in the projection information creation circuit 89. A face image area is represented by data representing the edge outputted form the boundary detection circuit 90. Individual mask data is created in the individual mask data creation circuit 95.

The individual mask data created by the edge search extraction processing is also temporarily stored in the mask data memory 98.

The roundness utilization extraction processing will be then described.

In the roundness utilization extraction processing, skin-colored pixels (also including pixels in a color close to a skin color) included in an input image are picked up in the skin-colored pixel extraction circuit 91. The skin-colored pixels picked up are clustered in the clustering circuit 92.

The circular area selection circuit 93 calculates the roundness of a skin-colored pixel area obtained by the clustering in the clustering circuit 92. A circular area having the roundness of a face (the roundness of an ellipse) is selected.

An area excluding a circular area (an elliptical area) selected by the circular area selection circuit 93 is handled as a background. An image portion serving as a background is removed by the background image removal circuit 94. The circular area (elliptical area) outputted from the background image removal circuit 94 is used as a face image area, so that individual mask data is created in a mask data creation circuit 95.

The individual mask data obtained by the roundness utilization extraction processing is also temporarily stored in the mask data memory 98.

When the mask data creating apparatus 1 is operated as the first mask data creating apparatus 1A, the second mask data creating apparatus 1B, and the fourth mask data creating apparatus 1D, a appropriateness degree is calculated in a appropriateness calculation circuit 99 for each of the individual mask data created by the area division extraction processing, the edge search extraction processing, and the roundness utilization extraction processing.

Figure 20:
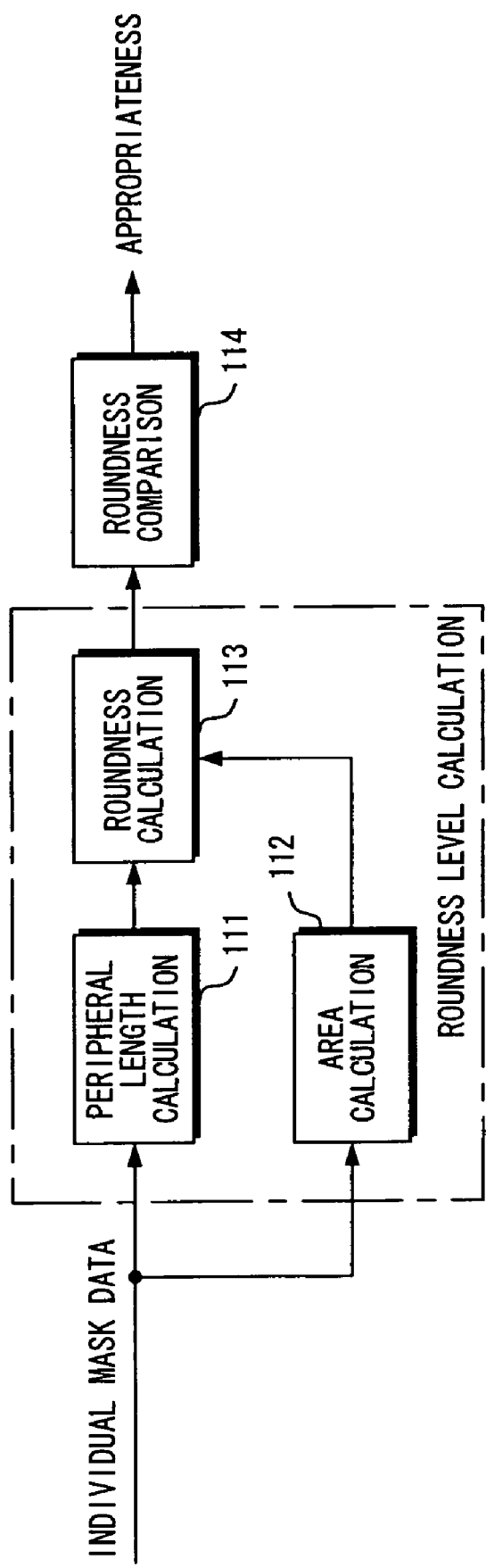
FIG. 20 is a functional block diagram of a appropriateness calculation circuit.

An example of a functional block diagram of the appropriateness calculation circuit 99 is shown in FIG. 20. The individual mask data is processed in each of a peripheral length calculation function 111 and an area calculation function 112. The peripheral length (the length of a line along an outer edge) L of a mask image represented by the individual mask data is calculated in the peripheral length calculation function 111. The area S of the mask image is calculated by the area calculation function 112.

The peripheral length L and the area S are used for calculating the roundness by the following equation in a roundness calculation function 113:

Roundness=(peripheral length $L$×peripheral length $L$)/area $S$

A appropriateness degree corresponding to the calculated roundness is calculated by a roundness comparison function 114. The closer the roundness calculated by the roundness calculation function 113 is to the roundness of the face of the character (previously determined), the higher the appropriateness degree to be outputted by the roundness comparison function 114 is.

Returning to FIG. 14, the appropriateness degree calculated by the appropriateness calculation circuit 99 is temporarily stored in a appropriateness memory 100.

FIG. 15 shows the contents of the appropriateness memory 100. An example shown in FIG. 15 shows appropriateness degrees (a total of nine appropriateness degrees) obtained on the basis of face image areas extracted, after detecting three face images (a face A, a face B, and a face C) included in an input image, by the three types of extraction processing (area division extraction processing, edge search extraction processing, and roundness utilization extraction processing) for each of the three face images A, B, and C.

Figure 18:
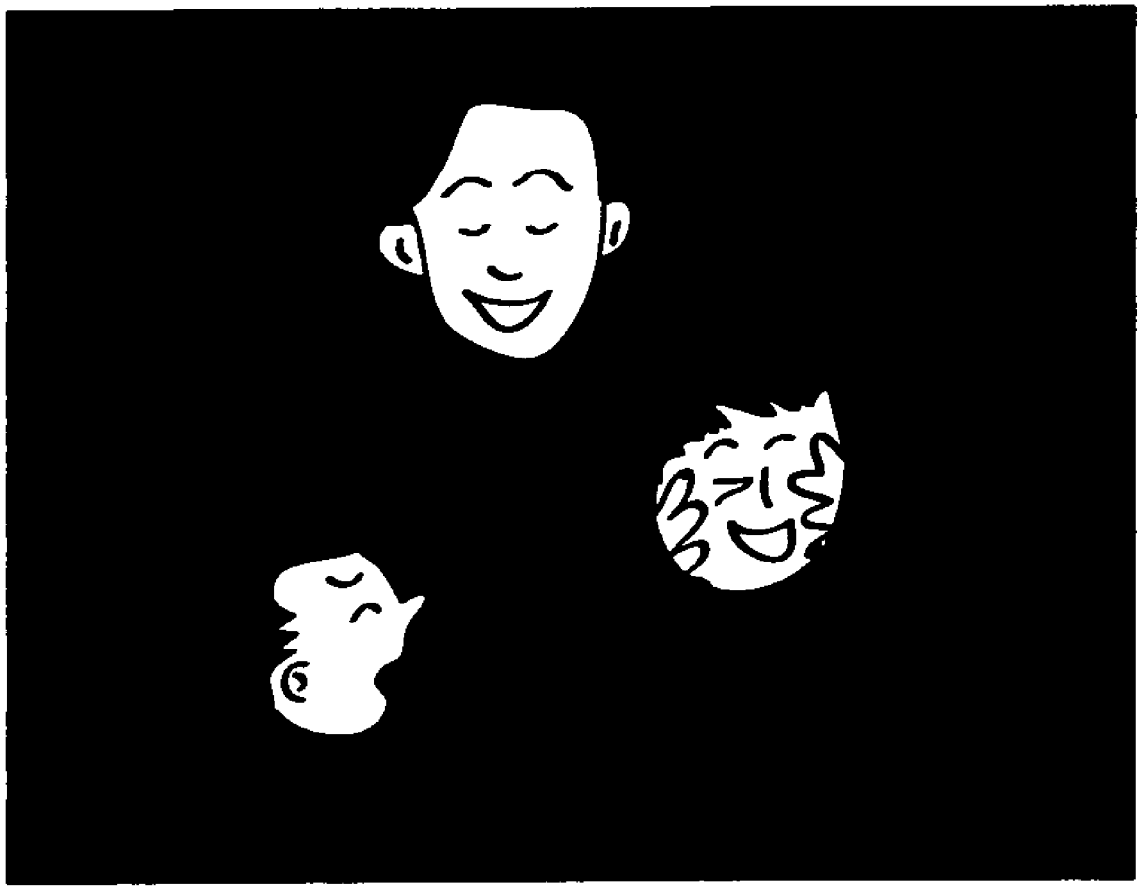
FIG. 18 illustrates an image represented by mask data.

When the mask data creating apparatus 1 functions as the mask data creating apparatus 1A, a mask data creation circuit 96 judges which of the respective results of the area division extraction processing, the edge search extraction processing, and the roundness utilization extraction processing are valid for each of the face image areas A, B, and C on the basis of the appropriateness degrees stored in the appropriateness memory 100. In the case shown in FIG. 15, the appropriateness degree for the results of the edge search extraction processing is the highest for the face image A, the appropriateness degree for the results of the roundness utilization extraction processing is the highest for the face image B, and the appropriateness degree for the results of the area division extraction processing is the highest for the face image C. The mask data creation circuit 96 reads out from the mask data memory 98 individual mask data obtained by the edge search extraction processing for the face image A, individual mask data obtained by the roundness utilization extraction processing for the face image B, and individual mask data obtained by the area division extraction processing for the face image C, and synthesizes them, to create mask data (entire mask data) (FIG. 18).

The created mask data is outputted to the exterior through an output terminal (an interface) 97.

When the mask data creating apparatus 1 function as the second mask data creating apparatus 1B, the area division extraction processing is first performed, to calculate a appropriateness degree, for example. If the calculated appropriateness degree is not less than a predetermined value, the individual mask data obtained by the area division extraction processing is used for creating mask data. The edge search extraction processing and the roundness utilization extraction processing are not performed. When the appropriateness degree calculated by performing the area division extraction processing is less than the predetermined value, the edge search extraction processing is performed, to calculate a appropriateness degree. If the appropriateness degree calculated by performing the edge search extraction processing is less than the predetermined value, the roundness utilization extraction processing is performed.

When the mask data creating apparatus 1 functions as the third mask data creating apparatus 1C, the appropriateness calculation by the appropriateness calculation circuit 99 is not performed. An OR area for the face image areas respectively extracted by the area division extraction processing, the edge search extraction processing, and the roundness utilization extraction processing, which are stored in the mask data memory 98, is created, and individual mask data is created in the mask data creation circuit 96 on the basis of the OR area.

In a case where the mask data creating apparatus 1 functions as the fourth mask data creating apparatus 1D, if any of the appropriateness degrees stored in the appropriateness memory 100 are not less than a predetermined value, an OR area is created from the face image areas based on the extraction processing in which the appropriateness degrees are obtained, and individual mask data is created in the mask data creation circuit 96 on the basis of the OR area. When there are no appropriateness degrees that are not less than the predetermined value, the individual mask data based on the extraction processing in which the highest appropriateness degree is obtained is employed.

In the mask data creating apparatus 1, the individual mask data is created from the face image area data, and the appropriateness degree is calculated on the basis of the created individual mask data. The appropriateness degree may be calculated on the basis of the face image area data instead of calculating the appropriateness degree on the basis of the individual mask data.

Although description was made on the premise that the mask data creating apparatus 1 is composed of a hardware circuit, the whole or a part thereof can be also realized by software (a program).

Second Embodiment

Figure 21:
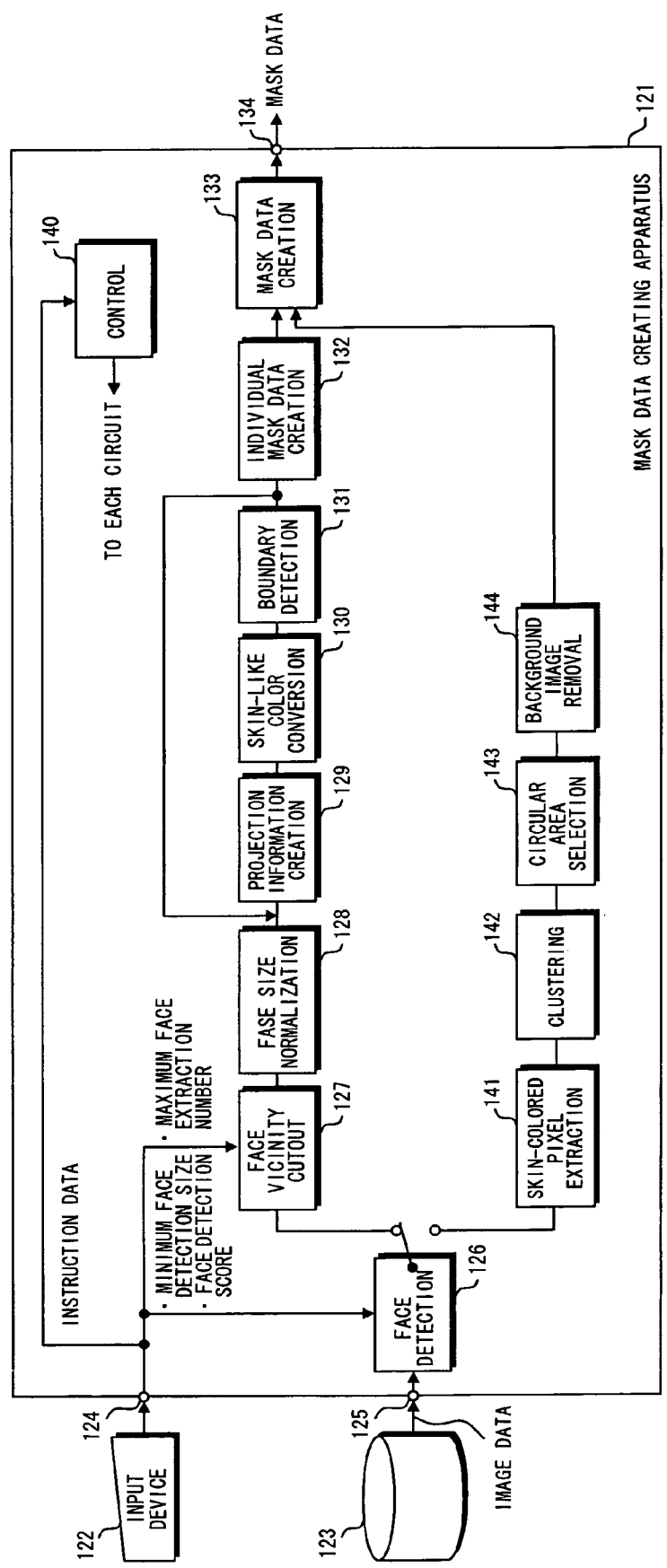
FIG. 21 is a block diagram showing the electrical configuration of a mask data creating apparatus.
Figure 22:
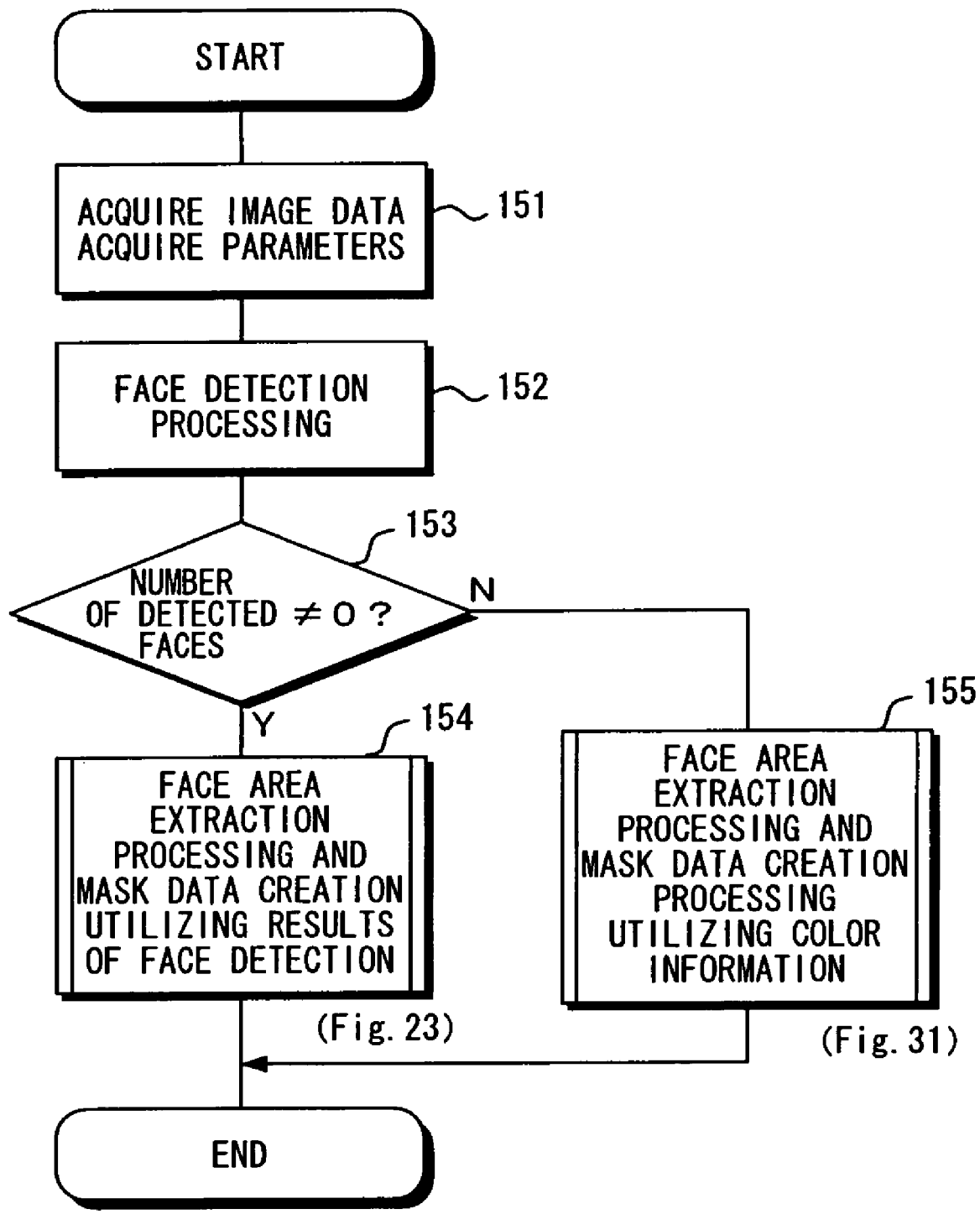
FIG. 22 is a flow chart showing the flow of operations of the mask data creating apparatus.

FIG. 21 is a block diagram showing the electrical configuration of a mask data creating apparatus 121 in a second embodiment. FIG. 22 is a flow chart showing the flow of operations of the mask data creating apparatus 121.

The mask data creating apparatus 121 is an apparatus for extracting (partitioning off), on the basis of image data representing an image including an image representing the face of a character, an area representing the face of the character (a face image area), and creating mask data for the extracted (partitioned) face image area. The mask data created by the mask data creating apparatus 1 can be used for various types of image processing for the image data. For example, by using the created mask data, the position and the range of a face image area included in an image (hereinafter referred to as an input image) represented by inputted image data (hereinafter referred to as input image data) are specified. Therefore, processing for subjecting the image data to white balance correction, gamma correction, and other corrections, for example, can be performed using the face image area as an object such that the specified face image area is reproduced (displayed) more beautifully (or more faithfully).

The mask data creating apparatus 121 is so configured that it can perform two types of face image area extraction processing.

The first extraction processing is face image area extraction processing utilizing the results of face detection. In the mask data creating apparatus 121, it is detected whether or not an image representing the face of a character (a face image) exists in an input image represented by input image data by pattern matching based on shapes prior to performing the face image area extraction processing. When it is detected that the face image exists in the input image, the face image area extraction processing utilizing the results of face detection is performed.

The second extraction processing is face image area extraction processing utilizing color information. It may not, in some cases, be detected that a face image exists in an input image by the above-mentioned face image detection, although it exists in the input image. In this case, the face image area extraction processing utilizing color information is performed.

Instruction data (a starting instruction, etc.) is inputted from an input device (a keyboard, a mouse, etc.) 122 connected to the mask data creating apparatus 121. The inputted instruction data is given to a control circuit 140. The mask data creating apparatus 121 is controlled in a supervised manner by the control circuit 140.

Data respectively representing a minimum face detection size, a face detection score, and a maximum face extraction number (hereinafter collectively referred to as parameters) are also inputted from the input device 122 (step 151).

The minimum face detection size represents the size of the minimum face image to be detected in face detection processing, described later. The minimum face detection size is inputted (designated) depending on its ratio to the number of pixels (the number of pixels in the vertical direction and the number of pixels in the horizontal direction) or the size of an input image.

The face detection score represents the minimum value of the detection score of the face image. In the face detection processing, face detection is performed by pattern matching based on shapes. When a matching score obtained by the pattern matching is not less than a predetermined value, it is judged that the face image is detected. The face detection score represents the predetermined value.

The maximum face extraction number is used for selecting, when a plurality of face images exist in an input image, the face image to be extracted out of the detected face images. When the input image includes the face images whose number is more than the maximum face extraction number, and the face images whose number is more than the maximum face extraction number are detected by the face detection processing, the face images corresponding to the maximum face extraction number are selected out of the face images, and the face image area extraction processing is performed for the selected face images.

The minimum face detection size and the face detection score that are inputted from the input device 122 are given to a face detection circuit 126 through an input terminal (an input interface) 124. The maximum face extraction number is given to a face vicinity area cutout circuit 127 through the input terminal (input interface) 124.

Image data representing an image including a face image read out of a storage device 123 (a hard disk, a flexible disk, a CD-ROM, a memory card, etc.) is given to the face detection circuit 126 through an input terminal 125.

The face detection processing is performed in the face detection circuit 126 (step 152). The face detection circuit 126 detects a face image included in an input image by pattern matching based on shapes, as described above. Pattern matching using a gradation pattern of a typical face may be employed in place of or in addition to the pattern matching based on shapes. In either case, when a matching score of not less than the face detection score is obtained, the face detection circuit 126 detects that the face image is included in the input image. Further, the face image of a smaller size than the minimum face detection size is not handled as the detected face image even if the matching score is not less than the face detection score.

The face detection circuit 126 detects the face image included in the input image by the pattern matching based on shapes, as described above. When the face image is directed sideways, for example, therefore, the face image cannot, in some cases, be detected, although it exists in the input image. In this case, face image extraction processing using color information is performed, as described later.

First, description is made of a case where a face image is detected by the face detection circuit 126.

Figure 23:
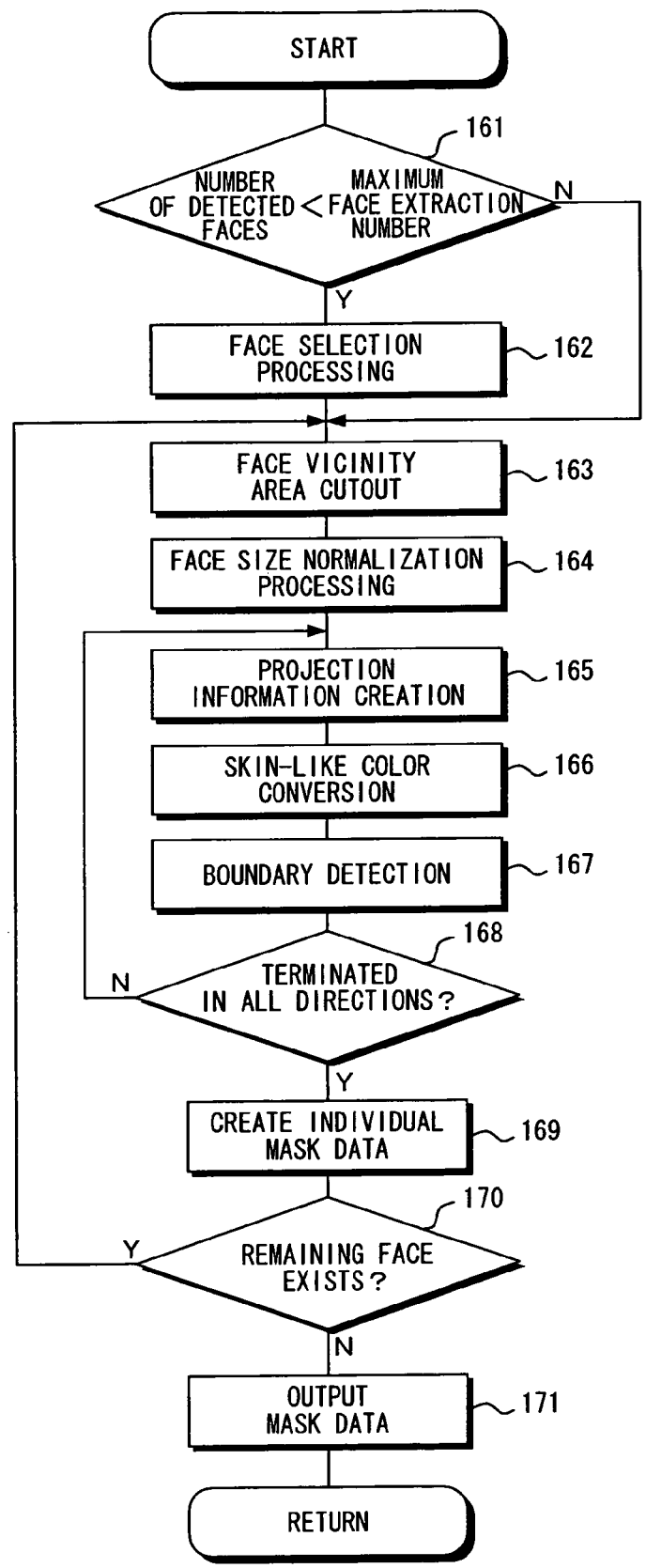
FIG. 23 is a flow chart showing the flow of face image area extraction processing and mask data creation processing utilizing the results of face detection.

When a face image in an input image is detected by the face detection circuit 126, face image area extraction processing and mask data creation processing utilizing the results of the face detection are performed (YES in step 153, step 154). FIG. 23 is a flow chart showing an example of face image area extraction processing and mask data creation processing utilizing the results of the face detection in detail. The face image area extraction processing and the mask data creation processing utilizing the results of the face detection will be described while referring to specific examples of images shown in FIGS. 24A to 30.

The face detection circuit 126 outputs, when it detects the face image included in the input image, data representing the approximate center of the detected face image (e.g., relative coordinates) and data representing the size thereof (based on the size of a pattern used for pattern matching). When a plurality of face images are detected, data representing the approximate center of each of the detected plurality of face images and data representing the size thereof are outputted.

In the face image area extraction processing and the mask data creation processing utilizing the results of the face detection, a face vicinity cutout circuit 127, a face size normalization circuit 128, a projection information creation circuit 129, a skin-like color conversion circuit 130, a boundary detection circuit 131, an individual mask data creation circuit 132, and a mask data creation circuit 133 are used.

The face vicinity cutout circuit 127 is a circuit for cutting out a rectangular area including the face image included in the input image, as described later. Further, the face vicinity cutout circuit 127 performs face selection processing prior to the cutout processing when the number of face images detected by the face detection circuit 126 exceeds the above-mentioned maximum face extraction number (YES in step 161, step 162).

When the number of face images detected by the face detection circuit 126 exceeds the maximum face extraction number, the face vicinity cutout circuit 127 calculates the distance between the center of each of the face images and the center of the input image. The face images corresponding to the maximum face extraction number are selected out of the detected face images in ascending order of the distances.

Of course, the face images can be selected from the viewpoint of the size, the matching score, and others of the face image in addition to the selection of the face images using distances.

When the number of face images detected by the face detection circuit 126 is not more than the maximum face extraction number, the above-mentioned face selection processing is not performed (NO in step 161).

The face vicinity cutout circuit 127 cuts out (partitions off) a rectangular area (hereinafter referred to as a face vicinity area) including the face image included in the input image using the data representing the center of each of the detected face images and the data representing the size thereof that are given from the face detection circuit 126 (step 163).

Figure 24A:
FIGS. 24A and 24B respectively show an example of an input image and how an area including a face image area is cut out (partitioned off) by face vicinity area cutout processing.
Figure 24B:
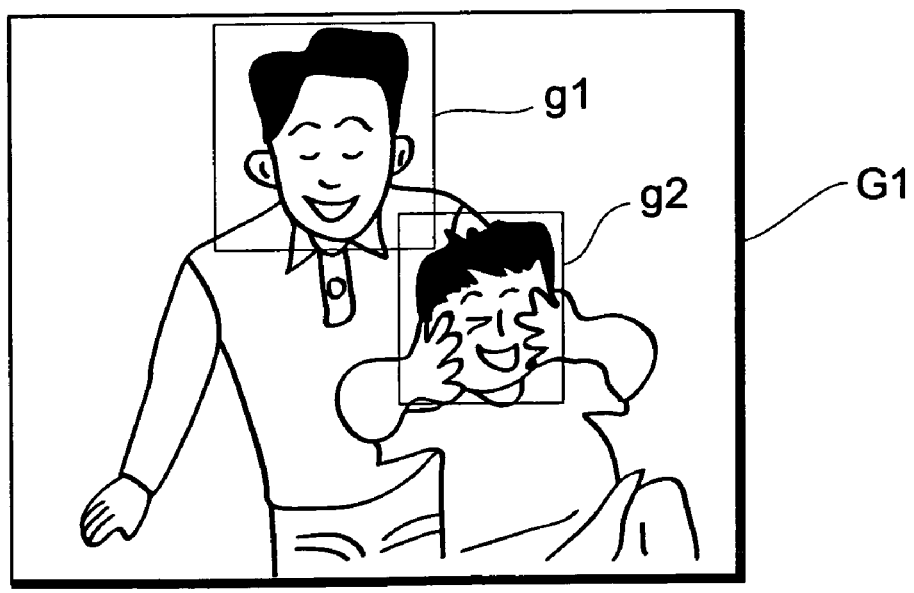

FIGS. 24A and 24B respectively illustrate an example of an input image G1 and two face vicinity areas g1 and g2 cut out (partitioned off) by the face vicinity cutout circuit 7 from the input image G1. The positions of the face vicinity areas g1 and g2 are based on data representing the center of the detected face image (two face images) given from the face detection circuit 126. The sizes of the face vicinity areas g1 and g2 are based on data, representing the size of the detected face image, given from the face detection circuit 126. Processing, described below, is performed for each of the face vicinity areas g1 and g2. The face vicinity area g1 shown in FIG. 24B will be specifically taken and described. In the face vicinity area g1 shown in FIG. 24B, it is presupposed that the background of a character is in a white color.

Image data representing the face vicinity area g1 is given to the face size normalization circuit 128 from the face vicinity cutout circuit 127. In the face size normalization circuit 128, image data representing the face vicinity area g1 is enlarged or reduced to a predetermined size (e.g., 256 pixels in height by 256 pixels in width) (step 164). The image data of a predetermined size is outputted from the face size normalization circuit 128. It goes without saying that if the image data given to the face size normalization circuit 128 has already been of the predetermined size, no special processing is performed in the face size normalization circuit 128.

The image data representing the face vicinity area g1, whose size has been normalized, outputted from the face size normalization circuit 128 is given to the projection information creation circuit 129.

The projection information creation circuit 129 performs processing for extracting (partitioning off) a face area of a character (determining the boundary between the face area and the other area) from the image represented by the image data representing the face vicinity area in cooperation with the skin-like color conversion circuit 130 and the boundary detection circuit 131 that are provided in the succeeding stages.

The processing performed by the projection information creation circuit 129 (step 165) will be described while referring to FIGS. 25A to 27A.

The projection information creation circuit 129 creates projection information (the projection information will be described later) using a rectangular projection information creating window w, which is long in the width direction, having a width that is one-half the width of the image data representing the face vicinity area whose size is normalized and having a predetermined height. The projection information creating window w is rotated through a predetermined angle at a time with the center of the face vicinity area as its axis, to create projection information using the projection information creating window w at each of angular positions.

Figure 25A:
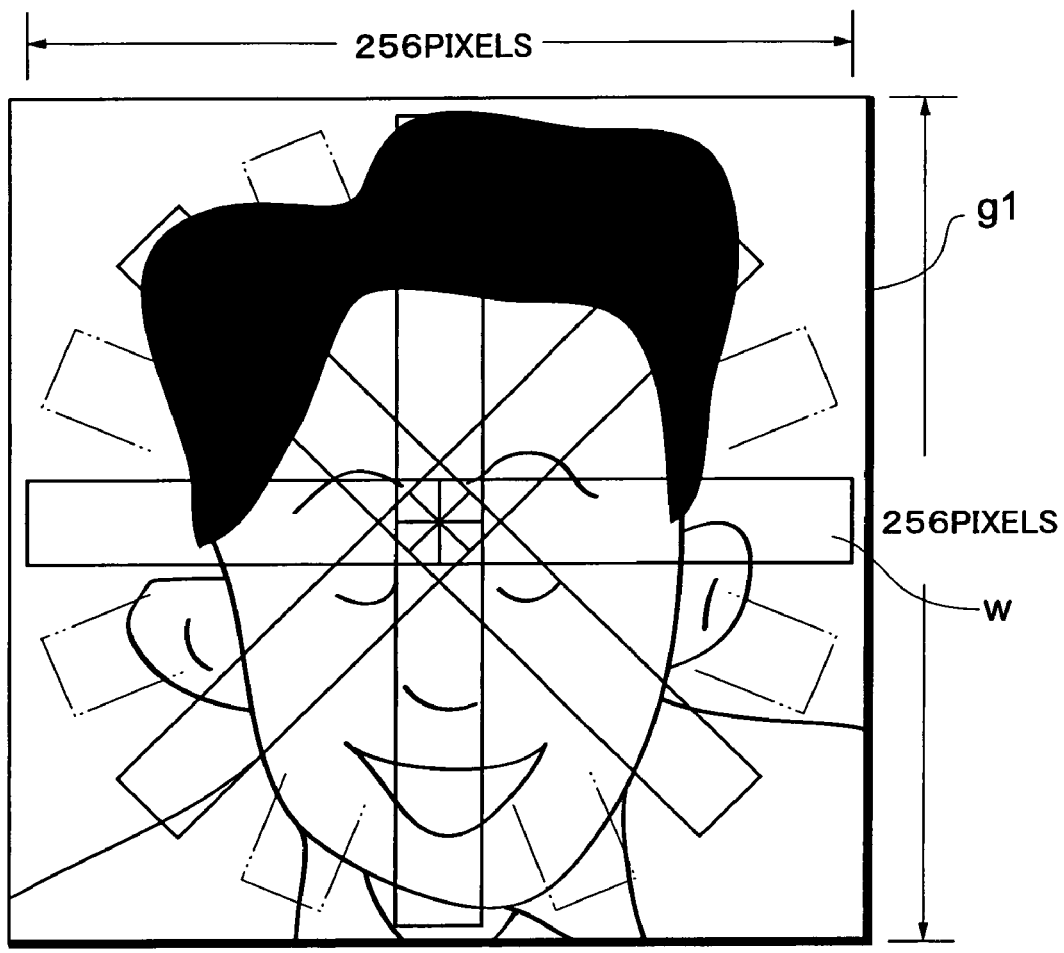
FIGS. 25A and 25B respectively show a positional relationship between a face vicinity area and a projection information creating window and how the projection information creating window is rotated.
Figure 25B:
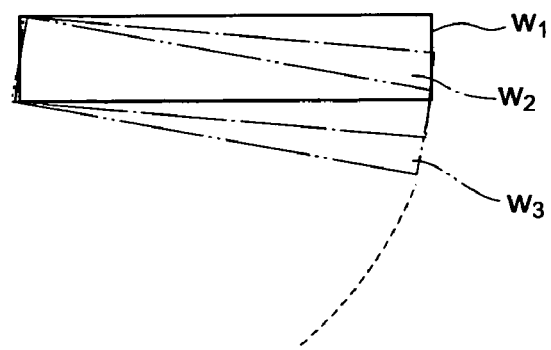

FIG. 25A illustrates a positional relationship between the face vicinity area g1 and the projection information creating window w. In FIG. 25A, each of a plurality of rectangular areas that are overlapped with the face vicinity areas g1 is the projection information creating window w. The center of one short side of the projection information creating window w coincides with the center of the face vicinity area g1 (the position thereof is fixed). Assuming that the projection information creating window w is rotated through 5.26 degrees, for example, at a time with the center of the face vicinity area g1 as its axis, the projection information creating window w on the face vicinity area g1 faces toward 64 directions. 64 projection information are respectively created at the angular positions in 64 directions (in FIG. 25 (A), the projection information creating windows w at all the angular positions (in 64 directions) are not illustrated for easy understanding). FIG. 25B shows how the projection information creating window w is rotated through 5.26 degrees at a time (in FIG. 25B, projection information creating windows w1, w2, and w3 at three adjacent angular positions are illustrated). Not less than the halves of the projection information creating windows w at the adjacent angular positions are overlapped with each other.

Figure 26A:
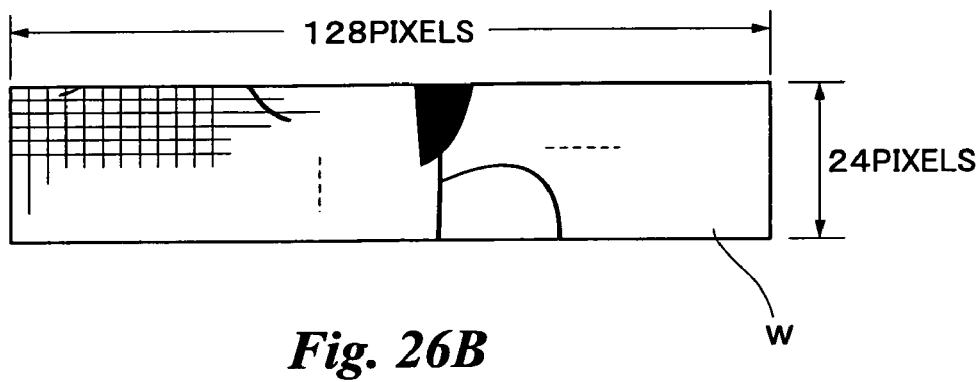
FIGS. 26A and 26B respectively illustrate an image portion within a projection information creating window, and a table storing luminance values for pixels composing an image within the projection information creating window and projection information relating to the luminance values.
Figure 26B:
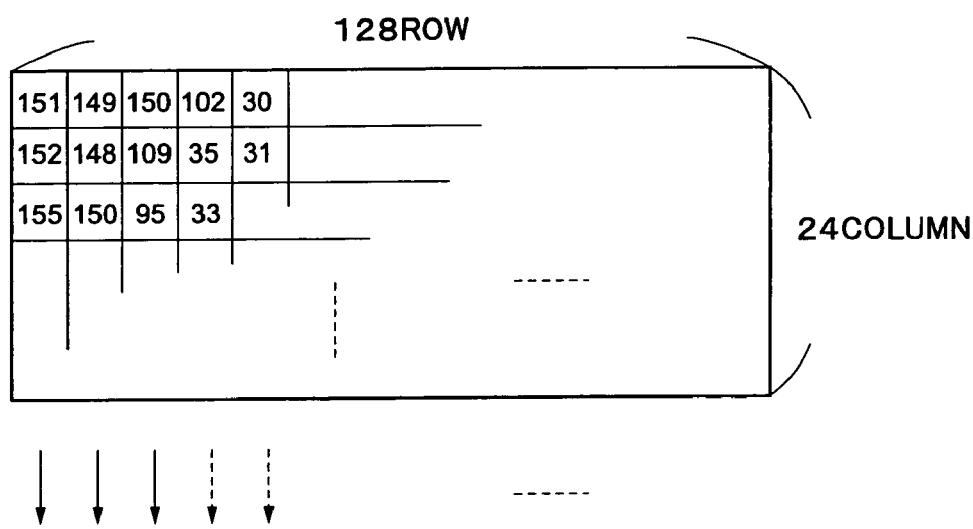

FIGS. 26A and 26B show how the projection information created at each of the angular positions is created.

The projection information is created (calculated) in the following manner.

(1) A luminance values (Y), a red color difference values (Cr), and a blue color difference values (Cb) are acquired for each of pixels composing an image within the projection information creating window w. Assuming that the height (the short side) of the projection information creating window w is composed of 24 pixels and the width (the long side) thereof is composed of 128 pixels (see FIG. 26A), three table data respectively storing a total of 3072 luminance values (Y), 3072 red color difference values (Cr), and 3072 blue color difference values (Cb) in 24 columns by 128 rows are obtained. FIG. 26B shows the table data storing the luminance values (Y). It goes without saying that the same table data is obtained with respect to each of the red color difference values (Cr) and the blue color difference values (Cb).

(2) The values for each of the rows are added (summed) with respect to each of the obtained three table data. For example, when the table data storing a total of 3072 luminance values (Y) in 24 columns by 128 rows shown in FIG. 26B is obtained, the sum in the row direction of the 128 luminance values (Y) is obtained. The sum in the row direction of the 128 luminance values (Y) is projection information relating to the luminance values. The same projection information (projection information relating to the red color difference values (Cr) and projection information relating to the blue color difference values (Cb)) are also similarly obtained, respectively, with respect to the red color difference values (Cr) and the blue color difference values (Cb) (step 165).

Figure 27A:
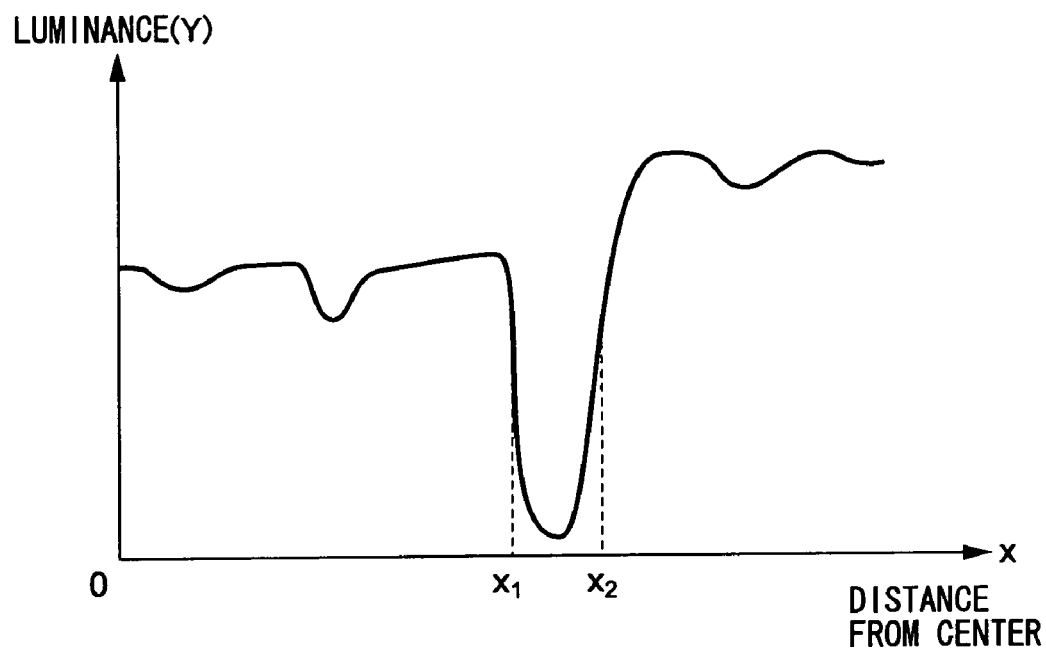
FIGS. 27A and 27B are respectively a graph showing projection information relating to luminance values, and a graph after skin-like color conversion processing.

FIG. 27A is a graphical representation of a relationship between the sum in the row direction of the luminance values (Y) (the vertical axis) and the distance x from the center of the face vicinity area (the horizontal axis). In the graph shown in FIG. 27A, $x_1$ denotes an approximate boundary position (the distance from the center of the face vicinity area) between a skin area (a skin color) and hair (a black color) in the image within the projection information creating window w, and $x_2$ denotes an approximate boundary position between hair (a black color) and a background (a white color) in the image within the projection information creating window w.

Although the illustration of a graphical representation of the projection information relating to the red color difference values (Cr) and a graphical representation relating to the blue color difference values (Cb) is omitted, the graphs are generally similar to the graph relating to the luminance values.

As apparent from the graph shown in FIG. 27A (the projection information relating to the luminance values shown in FIG. 26B), the approximate boundary position between the skin area and the other area, that is, the approximate boundary position between the face area in the image within the projection information creating window w and the other area can be detected by utilizing the projection information itself. For example, the distance from the center at which the luminance value (Y) greatly varies in the minus direction (the distance $x_1$ from the center in the graph shown in FIG. 27A) may be determined as an approximate boundary position between the face area and the other area.

In order to further improve the detection precision, the boundary position is detected in the following manner instead of detecting the boundary position utilizing the projection information itself.

Processing for converting the relationship between the distance x from the center of the face vicinity area and the projection information (the sum in the row direction of each of the Y, Cr, and Cb values) (FIG. 27A) into the relationship between the distance x from the center of the face vicinity area and the value representing a skin-like color is performed. The conversion processing is performed by the skin-like color conversion circuit 130 (step 166).

The processing for converting the relationship between the distance x from the center of the face vicinity area and the projection information (the sum in the row direction of each of the Y, Cr, and Cb values) into the relationship between the distance x from the center of the face vicinity area and the value representing a skin-like color, which is performed by the skin-like color conversion circuit 130, is realized by the following equation:

$$\sqrt{\begin{aligned}(Y(x)-Y(\text{skin}))^2 + \\ (C_r(x)-C_r(\text{skin}))^2 + (C_b(x)-C_b(\text{skin}))^2\end{aligned}} \quad \text{equation 1}$$

Here, Y(skin), Cr(skin), and Cb(skin) respectively denote a luminance value (Y), a red color difference value (Cr), and a blue color difference value (Cb) each representing an ideal skin color. In the equation 1, it is assumed that Y(0)=Y(skin), Cr(0)=Cr(skin), and Cb(0)=Cb(skin).

Figure 27B:
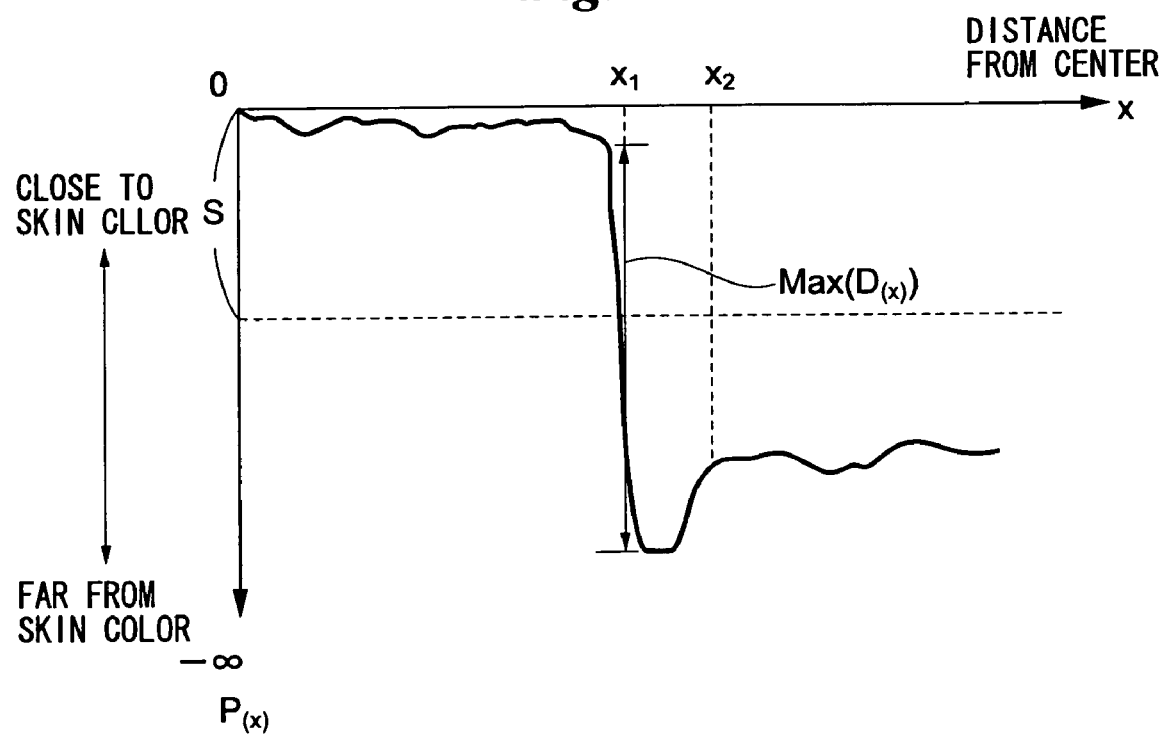

An example of a graph expressed on the basis of a value P(x) obtained by converting the projection information relating to the luminance values (Y), the red color difference values (Cr), and the blue color difference values (Cb) on the basis of the foregoing equation 1 is shown in FIG. 27B.

As apparent from the equation 1, P(x) representing a skin-like color after the conversion (FIG. 27B) denotes the distance from an ideal skin color. In the case of the ideal skin color, the skin-like color P(x) after the conversion becomes zero. The farther the skin color is apart from the ideal skin color, the larger the value of the skin-like color P(x) after the conversion becomes in the minus direction.

Here, a boundary position between the skin color and a color other than the skin color (the distance from the center of the face vicinity area) is taken as x (the distance x from the center of the face vicinity area) for calculating the maximum value obtained by the following equation 2;

$$D(x)=(P(x-1)+P(x-2)+P(x-3))-(P(x+1)+P(x+2)+P(x+3))$$ equation 2 where $P(x-1) \subseteq S$ and $P(x-2) \subseteq S$ and $P(x-3) \subseteq S$

S is a set of colors close to the skin color (see FIG. 27 (B): S is a set value)

A change position at which the skin color is (rapidly) changed into a color other than the skin color (the distance x from the center of the face vicinity area) is determined by the equation 2. The determined distance x from the center of the face vicinity area is determined as a boundary position between the skin color and the color other than the skin color in the image within the projection information creating window w, that is, a boundary position between the face area in the image portion within the projection information creating window w and the other area. Detection (determination) processing of the boundary position using the equation 2 is performed by the boundary detection circuit 131 (step 167).

The boundary position to be detected is the boundary position from the skin color to the color other than the skin color. In judgment based on the projection information (the graph shown in FIG. 27A), assuming that an image that is changed from a blue color to a red color is included in the background of a face area, for example, there is a high possibility that a boundary position from the blue color to the red color is evaluated similarly to the boundary position from the skin color to the color other than the skin color. On the other hand, when an image of an object in a skin color (or a color close to the skin color) exists in the background of a face area, there is a possibility that detection of a boundary position between the face area and the other area fails. However, the possibilities can be eliminated by using data representing a skin-like color, thereby improving the detection precision of the boundary position.

Figure 28A:
FIGS. 28A and 28B respectively show a relationship between a face vicinity area image and a boundary position and an individual mask image.
Figure 28B:

The above-mentioned boundary position is detected (determined) at each of the above-mentioned angular positions in the 64 directions (NO in step 168, steps 165 to 167). 64 boundary positions are detected (determined). In FIG. 28A, the boundary position detected (determined) at each of the angular positions is marked with X (In FIG. 28A, all the 64 boundary positions are not marked for easy understanding).

In the boundary detection circuit 131, the data (coordinate data) representing the 64 boundary positions respectively detected (determined) at the angular positions in the 64 directions and the image data relating to the face vicinity area g1 are given to the individual mask data creation circuit 132 (YES in step 168). The individual mask data creation circuit 132 creates image data representing an individual mask image (FIG. 28B) obtained by masking the outside of an area defined by connecting the adjacent boundary positions (step 169). An area (an inside area) defined by connecting the adjacent boundary positions is a face image area relating to a face image included in the face vicinity area g1. Of course, in a case where no skin color to be included in the face image area is included in an image portion in the vicinity of the determined boundary position (for example, a case where detection (determination) of the boundary position fails), the boundary position may be ignored to determine the face image area.

In the case of the image shown in FIGS. 24A and 24B, the above-mentioned processing is also performed for the face vicinity area g2 in addition to the face vicinity area g1 (YES in step 170). Individual mask image data relating to the face vicinity area g2 is also created.

Figure 29A:
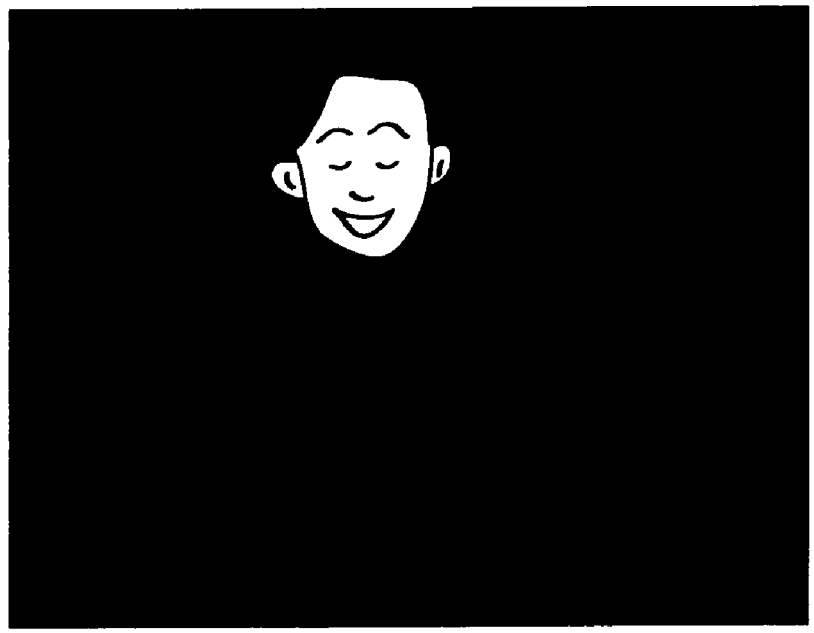
FIGS. 29A and 29B respectively illustrate individual mask images.
Figure 29B:
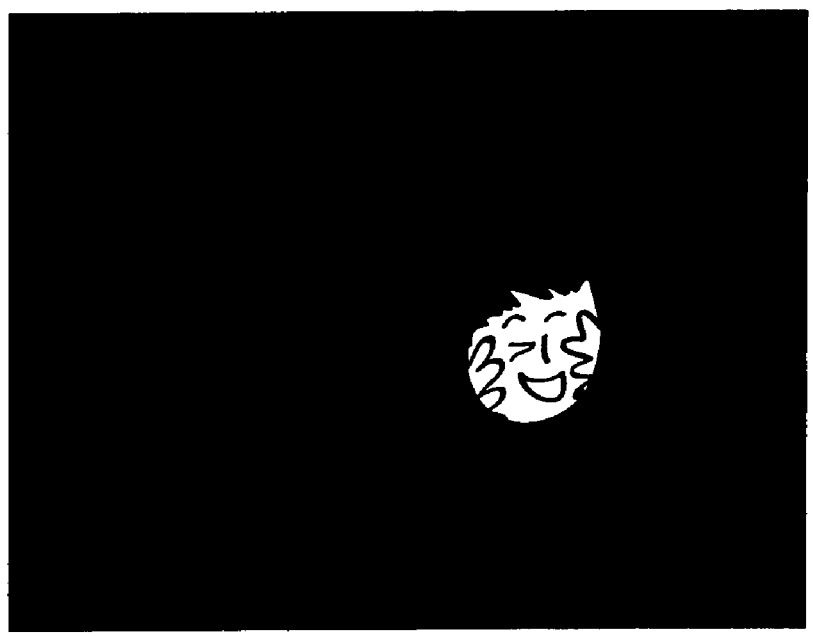
Figure 30:
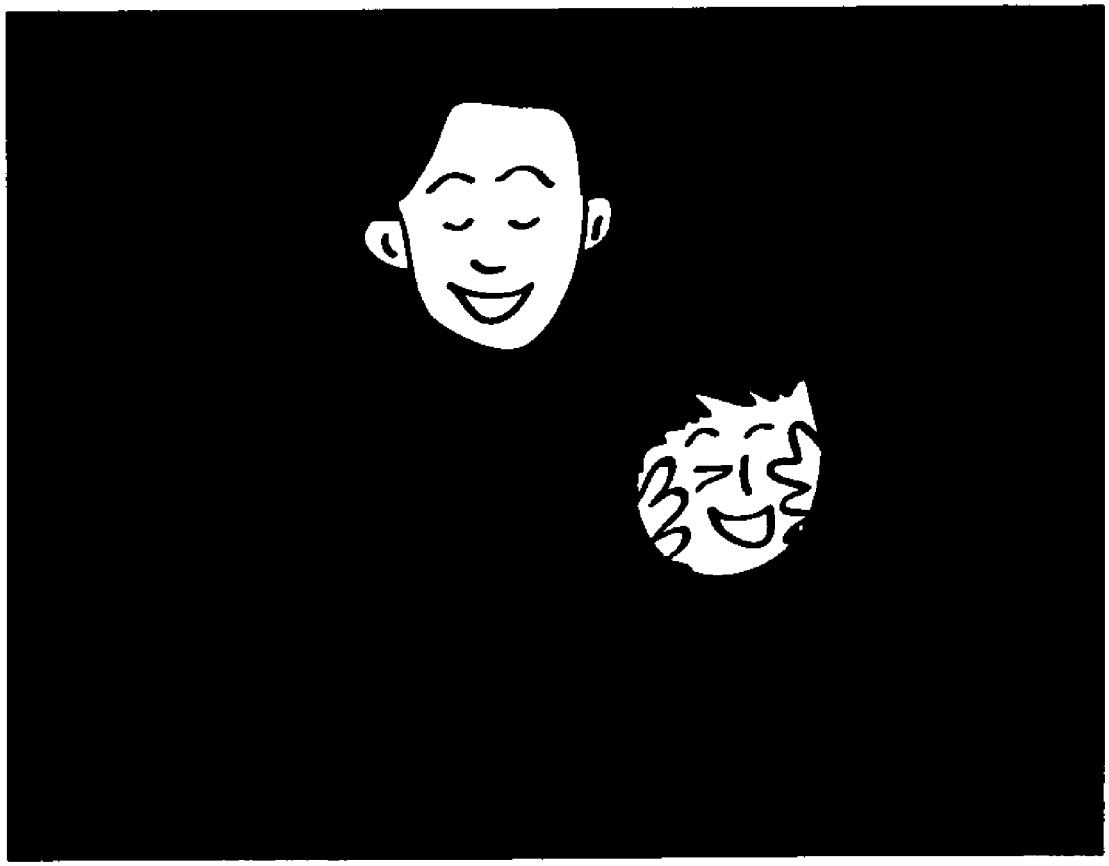
FIG. 30 illustrates a mask image.

When the processing for all the face vicinity areas is terminated (NO in step 170), the individual mask image data are given to the mask data creation circuit 133, and are synthesized and outputted (step 171). Examples of images respectively represented by two individual mask data obtained for the image shown in FIGS. 24A and 24B are illustrated in FIGS. 29A and 29B. An image represented by the mask image data finally outputted from the mask data creation circuit 133 is shown in FIG. 30.

Figure 31:
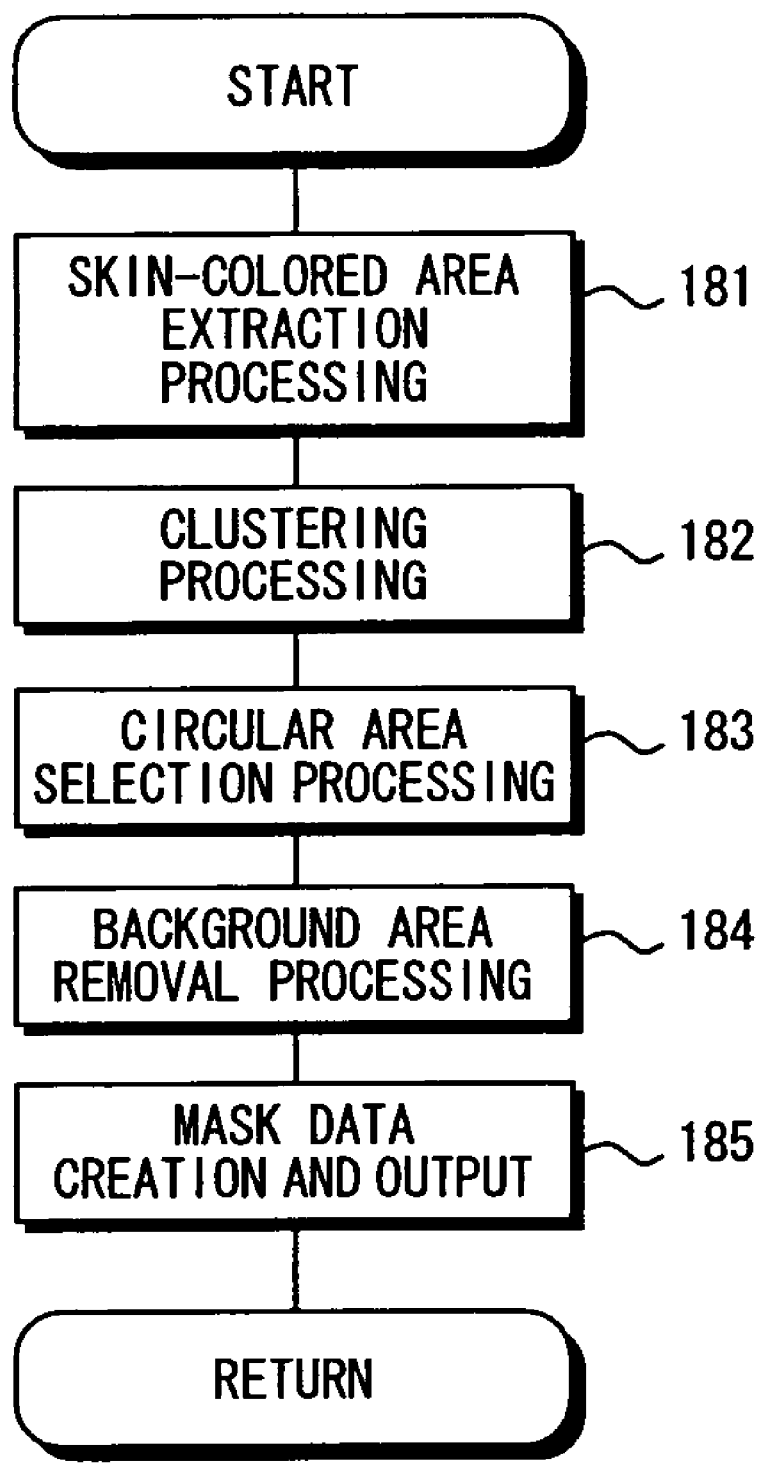
FIG. 31 is a flow chart showing the flow of face image area extraction processing utilizing color information and mask data creation processing.

Description is now made of a case where no face image is detected by the face detection circuit 126. FIG. 31 is a flow chart showing an example of face image area extraction processing and mask data creation processing using color information (the details of the processing in the step 155 shown in FIG. 22).

Figure 32A:
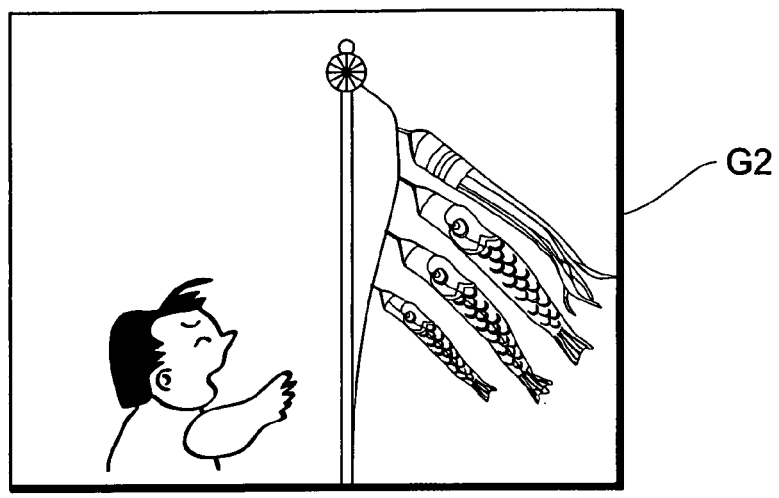
FIGS. 32A, 32B, and 32C respectively illustrate an example of an input image, an example of an image after clustering processing, and an example of an image after circular area selection processing.

For example, in a case where an image is as shown in FIG. 32A, that is, a face image exists in the image but is directed sideways, the face image cannot, in some cases, be detected in face detection processing by pattern matching. In such a case, face image area extraction processing using color information is performed.

In the face image area extraction processing using color information, a skin-colored pixel extraction circuit 141, a clustering circuit 142, a circular area selection circuit 143, a background image removal circuit 144, and the mask data creation circuit 133 are used.

When no face image is detected by the face detection circuit 126 (FIG. 22; NO in step 153), input image data is given to the skin-colored pixel extraction circuit 141, where skin-colored pixel area extraction processing is performed (FIG. 31; step 181).

The skin-colored pixel extraction circuit 141 performs processing for judging, with respect to each of pixels composing an input image, whether or not the color of the pixel is included in the range of the skin color, to partition off (extract) in the input image a pixel area (skin-colored pixel area) included in the range of the skin color.

As for the skin-colored pixel area extraction processing, a processing method described JP-A-9-101579 can be employed. That is, it is determined for each of pixels composing an input image, depending on whether or not the hue of the pixel is included in the range of a skin color defined by an ellipsoid (ellipsoid for defining a skin-colored pixel range that is determined on three-dimensional color coordinates respectively using an R value, a G value, and a B value as coordinate axes), whether the pixel is in the skin color or a color other than the skin color, and the pixels that are judged to be in the skin color (generally, a set of a plurality of pixels (a pixel area)) are partitioned off (extracted) by the skin-colored pixel extraction circuit 141.

Figure 32B:
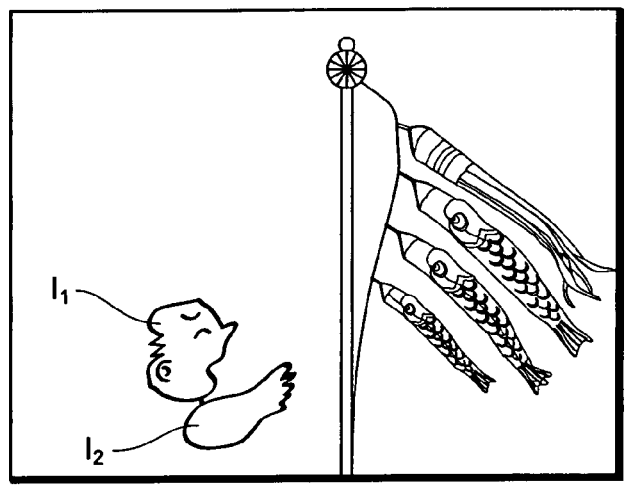

Clustering processing is then performed (step 182). In the clustering processing, the skin-colored pixels extracted by the skin-colored pixel extraction circuit 141 are clustered. For example, an image shown in FIG. 32A includes an image area of the side face of a character and an image area of the right arm of the character as image areas including the skin-colored pixels. In this case, as shown in FIG. 32B, a cluster I1 of skin-colored pixels in the side face image area and a cluster I2 of skin-colored pixels in the right arm image area are created by the clustering circuit 142. In FIG. 32B, in order to make the clusters I1 and I2 of skin-colored pixels understandable, pixel portions other than the clusters I1 and I2 of skin-colored pixels are omitted in the image representing the character.

The image data which has been subjected to the clustering is given to the circular area selection circuit 143. The circular area selection circuit 143 judges, for each of the skin-colored pixel areas clustered by the clustering processing, whether or not the shape thereof is a shape close to a circle (including an ellipse) (step 183). For example, in the case of the two skin-colored pixel areas I1 and I2 shown in FIG. 32B, it is judged that the face image area I1 is close to the circle and the right arm image area I2 is far from the circle.

Figure 32C:
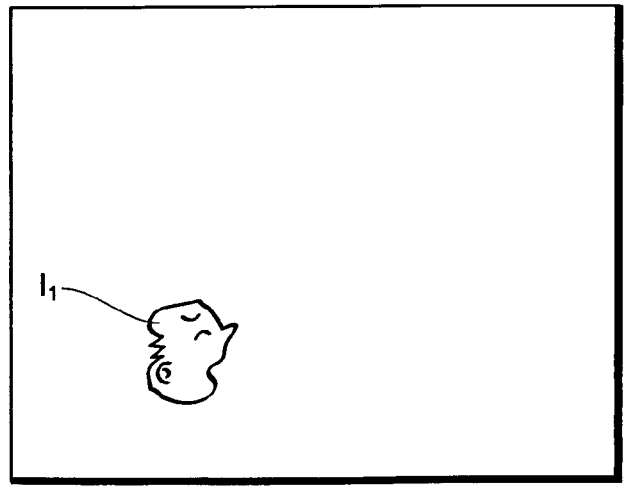

An area excluding the circular area (face image area I1) selected by the circular area selection circuit 143 is handled as a background. The background image removal circuit 144 removes an image portion serving as a background (step 184). Image data representing the area (face image area I1) shown in FIG. 32C is outputted from the background image removal circuit 144.

Figure 33:
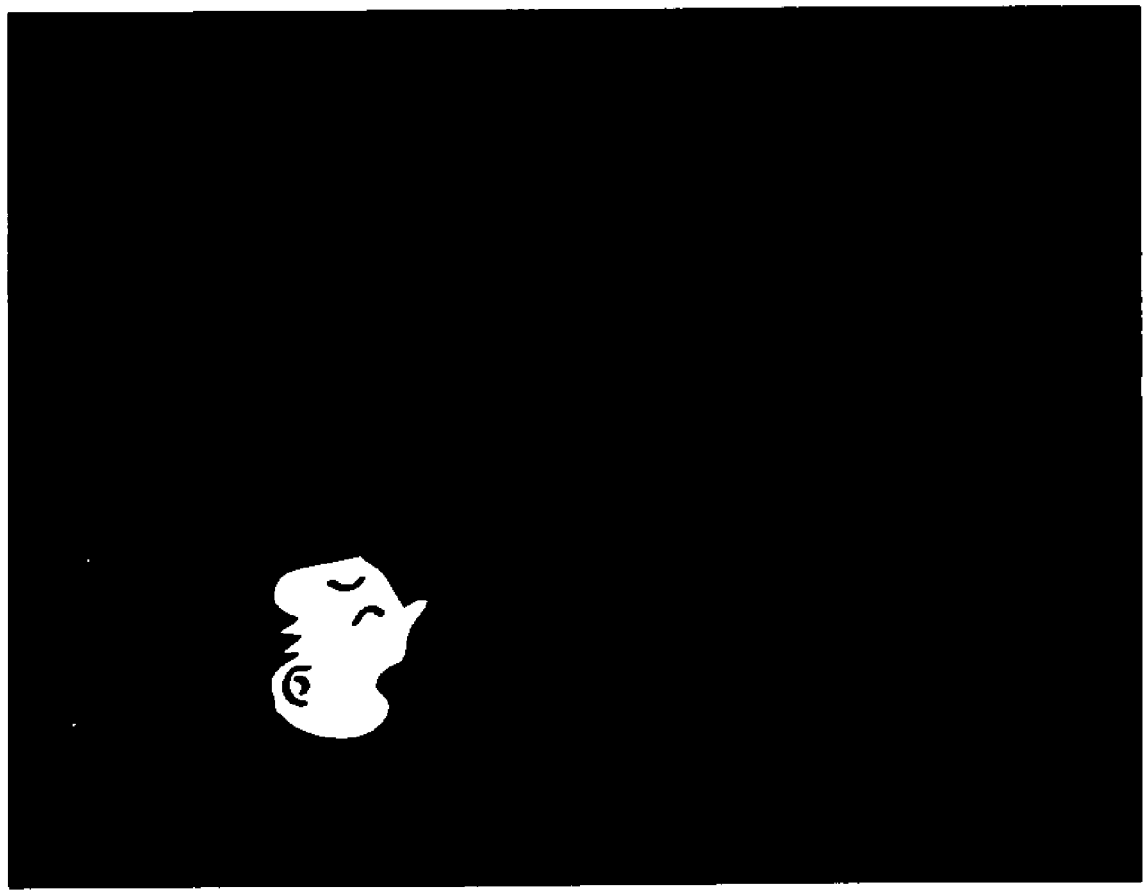
FIG. 33 illustrates an example of a mask image.

Mask image data is created in the mask data creation circuit 133 on the basis of the circular area (face image area I1) outputted from the background image removal circuit 144 (FIG. 33) (step 185).

Of course, as the processing for partitioning off (extracting) the face image area using color information, processing described in JP-A-9-101579 (processing for judging whether or not the hue of each of pixels composing an image is included in the range of a skin color, dividing the original image into a skin color area and a non-skin color area, further detecting an edge in the original image, classifying the original image into an edge portion and a non-edge portion, extracting an area positioned within the skin color area, composed of the pixels classified as the non-edge portion, and enclosed by the pixels judged as the edge portion as a face candidate area, and judging an area having a feature amount peculiar to the face of a character as an area corresponding to the face of the character) and the other processing may be employed.

When the mask data creating apparatus 121 can thus detect the face image in the input image, face image area extraction processing utilizing the results of the detection is performed. When the face image cannot be detected, although it is included in the input image, face image area extraction processing using color information is performed.

Figure 34:
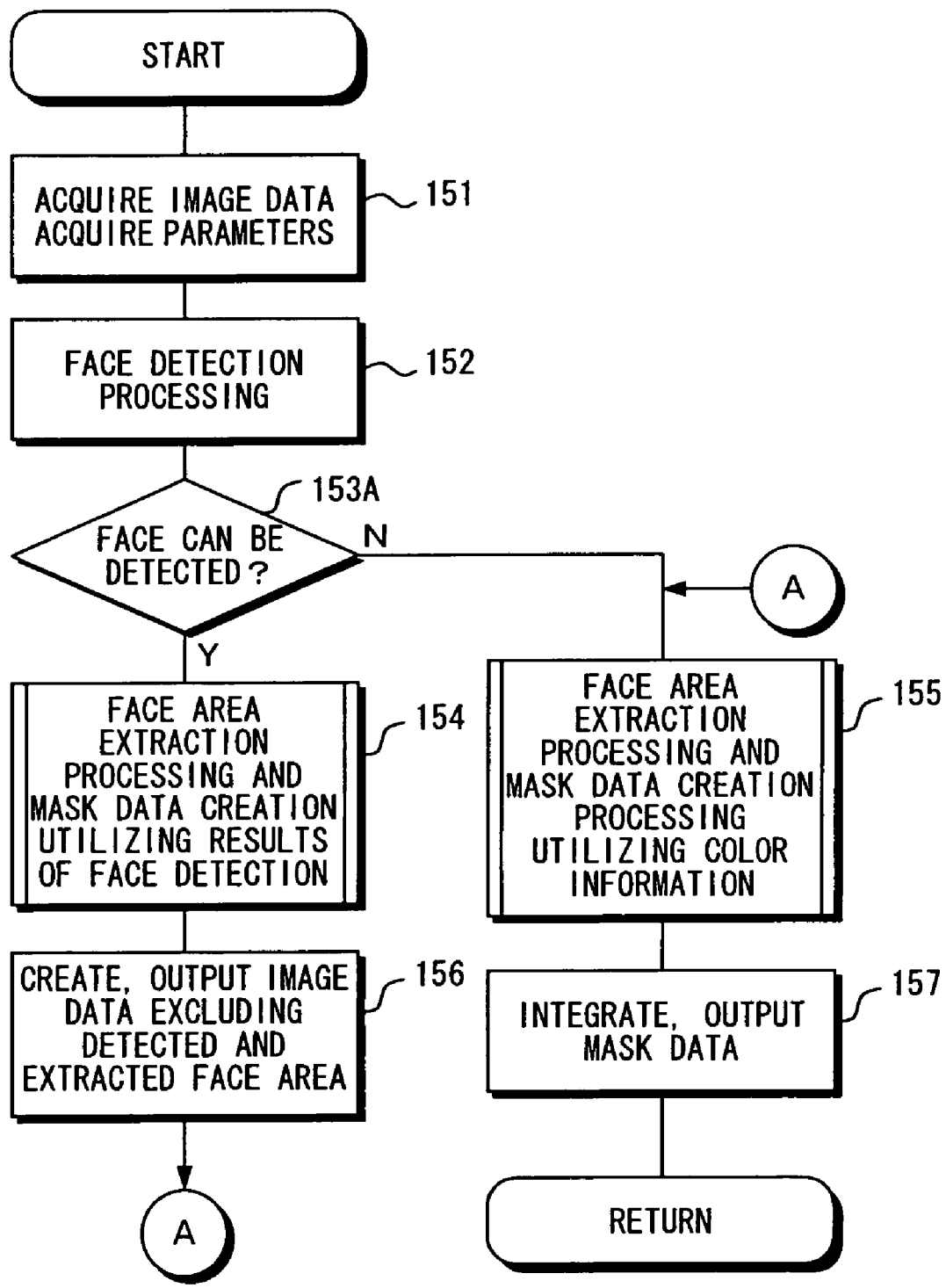
FIG. 34 is a flow chart showing the flow of other operations of the mask data creating apparatus.

FIG. 34 is a flow chart showing a modified example of the processing performed by the mask data creating apparatus 121. The same operations as those in the flow chart shown in FIG. 22 are assigned the same reference numerals and hence, the overlapped description is avoided.

Figure 35A:
FIGS. 35A and 35B respectively show an example of an input image and how an area including a face image area is cut out (partitioned off) by face vicinity area cutout processing.
Figure 35B:
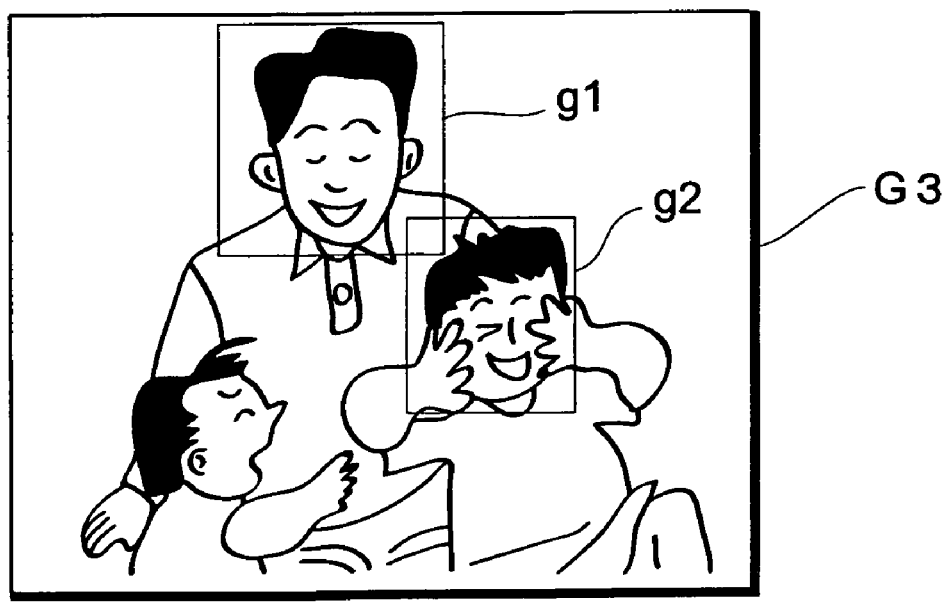

In the operations based on the flow chart shown in FIG. 34, the mask data creating apparatus 121 is controlled so as to be able to cope with a case where one input image includes both a face image from which a face is detectable and a face image from which a face is not detectable. Referring to FIG. 35A, an image G3 includes both a face image from which a face image area can be extracted on the basis of the results of the face detection and a face image from which a face is not detectable. For the face image from which a face can be detected (areas g1 and g2 in FIG. 35B), face image area extraction processing and mask data creation processing utilizing the results of the face detection are performed (YES in step 153A, step 154). In a case where the face detection cannot be performed, only the face image area extraction processing utilizing color information and the mask data creation processing are performed, as described above (NO in step 153A, step 155).

Figure 36A:
FIGS. 36A and 36B respectively illustrate an input image in which a face image area extracted by face image area extraction processing utilizing the results of face detection is indicated by hatching and an image after clustering processing in face image area extraction processing utilizing color information.
Figure 36B:
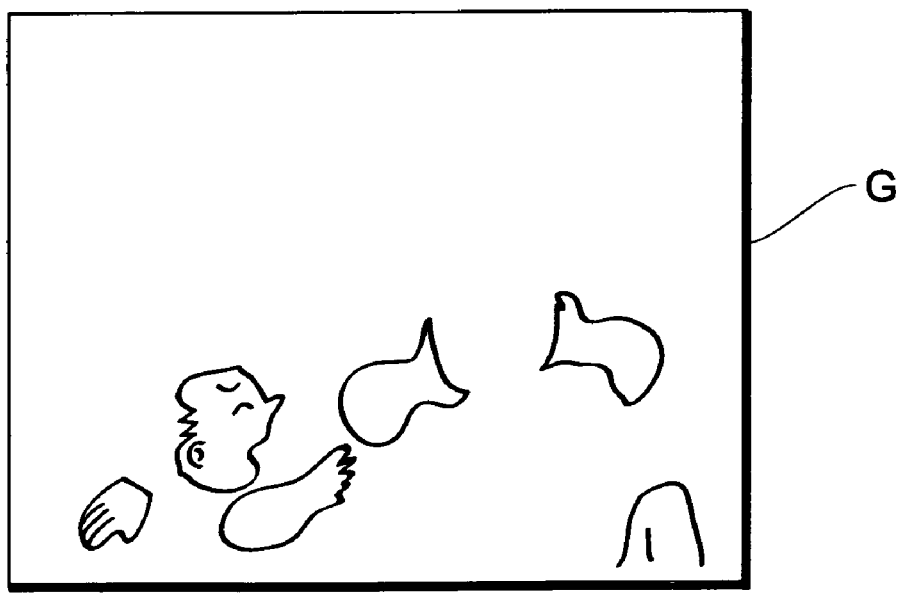

When an area excluding an extracted face image area is then subjected to the face image area extraction processing utilizing color information and the mask data creation processing (steps 156 and 155). A portion indicated by hatching in FIG. 36A (i.e., a face image portion extracted by the face image area extraction processing using the results of the face detection) is excluded, and the other area is subjected to the face image area extraction processing using color information. A clustering area shown in FIG. 36B is obtained. In the clustering area, an area having a shape close to a circle (an ellipse) (i.e., an area that is judged as a face image area) is extracted.

Figure 37:
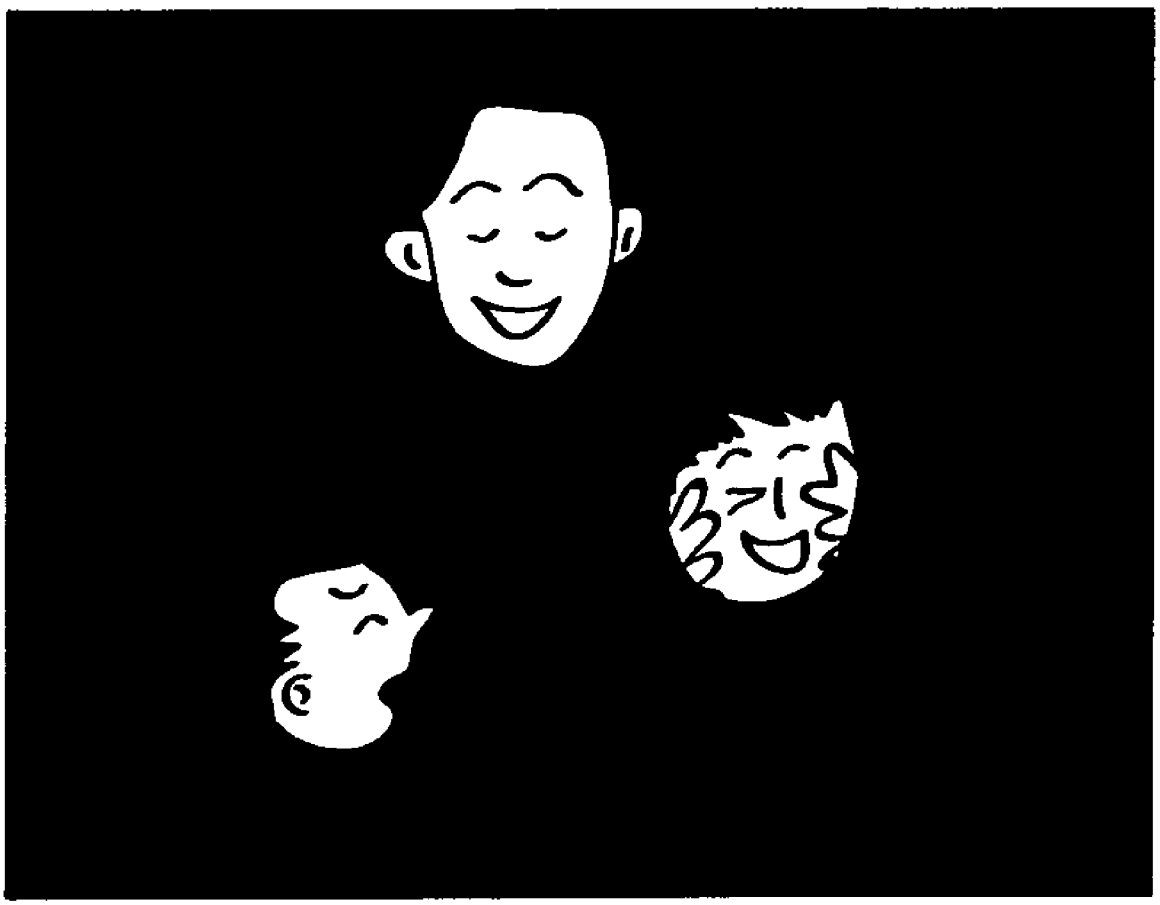
FIG. 37 illustrates an example of a mask image.

Mask data obtained through the face image area extraction processing utilizing the results of the face detection and mask data obtained through the face image area extraction processing utilizing color information are integrated (synthesized), and are outputted (step 157). FIG. 37 illustrates an example of an image represented by the mask data after the integration (synthesis) obtained on the basis of the input image G3 shown in FIG. 35A.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data processing apparatus comprising:
   particular image detection means for detecting whether or not a particular image exists in an image represented by given image data;
   a plurality of types of area partitioning means for respectively partitioning off, when the existence of particular image is detected by the particular image detection means, an area of the existing particular image by different types of partitioning processing;
   appropriateness calculation means for calculating, with respect to each of a plurality of partitioned areas respectively obtained by the plurality of types of area partitioning means, an appropriateness degree representing the degree to which the shape thereof is appropriate as a partitioning shape representing a contour of the particular image; and
   output means for outputting data representing the partitioned area for which the highest appropriateness degree is calculated on the basis of the plurality of appropriateness degrees calculated by the appropriateness calculation means,
   wherein the particular image is a face area.

2. An image data processing apparatus comprising:
   particular image detection means for detecting whether or not a particular image exists in an image represented by given image data;
   a plurality of types of area partitioning means for respectively partitioning off, when the existence of particular image is detected by the particular image detection means, an area of the existing particular image by different types of partitioning processing;
   appropriateness calculation means for calculating an appropriateness degree representing the degree to which the shape of each of partitioned areas respectively obtained by the area partitioning means is appropriate as a partitioning shape representing a contour of the particular image;
   comparison judgment means for comparing the appropriateness degree calculated by the appropriateness calculation means with a given value;
   control means for repeating, when the comparison judgment means judges that the appropriateness degree is not more than the given value, a sequence comprising area partitioning processing performed by the other area partitioning means, appropriateness calculation processing performed by the appropriateness calculation means, and comparison judgment processing performed by the comparison judgment means until the comparison judgment means judges that the appropriateness degree exceeding the predetermined value is obtained;

first output means for outputting, when the comparison judgment means judges that the appropriateness degree exceeds the given value, data representing the partitioned area obtained by the area partitioning means; and second output means for outputting, when all of the appropriateness degrees for the partitioned areas respectively obtained by all the area partitioning means are not more than the given value, data representing the partitioned area for which the highest appropriateness degree is calculated, wherein the particular image is a face area.

3. An image data processing apparatus comprising:

particular image detection means for detecting whether or not a particular image exists in an image represented by given image data;

a plurality of types of area partitioning means for respectively partitioning off, when the existence of particular image is detected by the particular image detection means, an area of the existing particular image by different types of partitioning processing;

appropriateness calculation means for calculating, with respect to each of a plurality of partitioned areas respectively obtained by the plurality of types of area partitioning means, an appropriateness degree representing the degree to which the shape thereof is appropriate as a partitioning shape representing a contour of the particular image; and first output means for outputting data representing an OR area of the one or the plurality of partitioned areas, excluding the partitioned area for which the appropriateness degree of not more than a given value is calculated, obtained by the area partitioning means; and second output means for outputting, when all the appropriateness degrees for the partitioned areas respectively obtained by all the area partitioning means are not more than the given value, data representing the partitioned area for which the highest appropriateness degree is calculated, wherein the particular image is a face area.

4. The image data processing apparatus according to any one of claims 1 to 3, further comprising mask data creation means for creating mask data on the basis of the data outputted from the output means.

5. The image data processing apparatus according to any one of claims 1 to 3, further comprising particular image number detection means for detecting the number of particular images detected by the particular image detection means, comparison judgment means for comparing the number of particular images detected by the particular image number detection means with a given number, importance calculation means for calculating, when the comparison judgment means judges that the detected number of particular images is more than the given number, an importance degree for each of the plurality of particular images detected by the particular image detection means, and selection means for selecting the particular images whose number is the same as the given number out of the plurality of particular images included in the image represented by the image data on the basis of the importance degrees calculated by the importance calculation means, the area partitioning means respectively obtaining the partitioned areas for the particular images, corresponding to the given number, selected by the selection means.

6. An image data processing method comprising the steps of:

detecting whether or not a particular image exists in an image represented by given image data;

respectively partitioning off, when the existence of particular image is detected, an area of the existing particular image by a plurality of different types of partitioning processing;

calculating, with respect to each of a plurality of partitioned areas respectively obtained by the plurality of types of partitioning processing, an appropriateness degree representing the degree to which the shape thereof is appropriate as a partitioning shape representing a contour of the particular image; and outputting data representing the partitioned area for which the highest appropriateness degree is calculated on the basis of the calculated appropriateness degrees, wherein the particular image is a face area.

7. An image data processing method comprising the steps of:

detecting whether or not a particular image exists in an image represented by given image data;

respectively partitioning off, when the existence of particular image is detected, an area of the existing particular image by one of a plurality of different types of partitioning processing;

calculating an appropriateness degree representing the degree to which the shape of each of partitioned areas obtained by the partitioning is appropriate as a partitioning shape representing a contour of the particular image;

comparing the calculated appropriateness degree with a given value;

repeating, when the appropriateness degree is not more than the given value, a sequence comprising the other area partitioning processing, appropriateness calculation processing, and comparison processing until the appropriateness degree exceeding the given value is obtained;

outputting, when the appropriateness degree exceeds the given value, data representing the partitioned area for which the appropriateness degree is calculated; and outputting, when all the appropriateness degrees for the partitioned areas respectively obtained by all the types of partitioning processing are not more than the given value, data representing the partitioned area for which the highest appropriateness degree is calculated, wherein the particular image is a face area.

8. An image data processing method comprising the steps of:

detecting whether or not a particular image exists in an image represented by given image data;

respectively partitioning off, when the existence of particular image is detected, an area of the existing particular image by a plurality of different types of partitioning processing;

calculating, with respect to each of a plurality of partitioned areas respectively obtained by the plurality of types of partitioning processing, an appropriateness degree representing the degree to which the shape thereof is appropriate as a partitioning shape representing a contour of the particular image;

outputting data representing an OR area of the one or the plurality of partitioned areas, excluding the partitioned area for which the appropriateness degree of not more than a given value is calculated; and outputting, when all the appropriateness degrees for the partitioned areas respectively obtained by all the types of partitioning processing are not more than the given value, data representing the partitioned area for which the highest appropriateness degree is calculated, wherein the particular image is a face area.

9. The image data processing method according to any one of claims 6 to 8, further comprising detecting the number of detected particular images;

comparing the detected number of particular images with a given number, calculating, when the number of particular images is more than the given number, an importance degree for each of the detected plurality of particular images, selecting the particular images whose number is the same as the given number out of the plurality of particular images included in the image data on the basis of the calculated importance degrees, and obtaining the partitioned areas for the selected particular images corresponding to the given number.

10. A computer-readable medium bearing software instructions for enabling a computer to perform predetermined operations, the predetermined operations comprising:

particular image detection processing for detecting whether or not a particular image exists in an image represented by given image data;

a plurality of types of area partitioning processing for respectively partitioning off, when the existence of particular image is detected by the particular image detection processing, an area of the existing particular image;

appropriateness calculation processing for calculating, with respect to each of a plurality of partitioned areas respectively obtained by the plurality of types of area partitioning processing, an appropriateness degree representing the degree to which the shape thereof is appropriate as a partitioning shape representing of a contour of the particular image; and output processing for outputting data representing the partitioned area for which the highest appropriateness degree is calculated on the basis of the appropriateness degrees calculated by the appropriateness calculation processing, wherein the particular image is a face area.

11. A computer-readable medium bearing software instructions for enabling a computer to perform predetermined operations, the predetermined operations comprising:

particular image detection processing for detecting whether or not a particular image exists in an image represented by given image data;

a plurality of types of area partitioning processing for respectively partitioning off, when the existence of particular image is detected by the particular image detection processing, an area of the existing particular image;

appropriateness calculation processing for calculating an appropriateness degree representing the degree to which the shape of the partitioned area obtained by the area partitioning processing is appropriate as a partitioning shape representing a contour of the particular image;

comparison judgment processing for comparing the appropriateness degree calculated by the appropriateness calculation processing with a given value;

control processing for repeating, when it is judged by the comparison judgment processing that the appropriateness degree is not more than the given value, a sequence comprising the other area partitioning processing, the appropriateness calculation processing, and the comparison judgment processing until it is judged by the comparison judgment processing that the appropriateness degree exceeding the given value is obtained;

first output processing for outputting, when it is judged by the comparison judgment processing that the appropriateness degree exceeds the given value, data representing the partitioned area obtained by the area partitioning processing; and second output processing for outputting, when all of the appropriateness degrees for the partitioned areas respectively obtained by all the types of area partitioning processing are not more than the given value, data representing the partitioned area for which the highest appropriateness degree is calculated, wherein the particular image is a face area.

12. A computer-readable medium bearing software instructions for enabling a computer to perform predetermined operations, the predetermined operations comprising:

particular image detection processing for detecting whether or not a particular image exists in an image represented by given image data;

a plurality of types of area partitioning processing for respectively partitioning off, when the existence of particular image is detected by the particular image detection processing, an area of the existing particular image;

appropriateness calculation processing for calculating, with respect to each of a plurality of partitioned areas respectively obtained by the plurality of types of area partitioning processing, an appropriateness degree representing the degree to which the shape thereof is appropriate as a partitioning shape representing a contour of the partitioned area;

first output processing for outputting data representing an OR area of the one or the plurality of partitioned areas, excluding the partitioned area for which the appropriateness degree of not more than a given value is calculated, obtained by the area partitioning processing; and second output processing for outputting, when all the appropriateness degrees for the partitioned areas respectively obtained by all the types of area partitioning processing are not more than the given value, data representing the partitioned area for which the highest appropriateness degree is calculated, wherein the particular image is a face area.

13. The computer-readable medium according to any one of claims 10 to 12, further comprising particular image number detection processing for detecting the number of particular images detected by the particular image detection processing, comparison judgment processing for comparing the number of particular images detected by the particular image number detection processing with a given number, importance calculation processing for calculating, when it is judged by the comparison judgment processing that the detected number of particular images is more than the given number, an importance degree for each of the plurality of particular images detected by the particular image detection processing, and further causing a computer to perform selection processing for selecting the particular images whose number is the same as the given number out of the plurality of particular images included in the image represented by the image data on the basis of the importance degrees calculated by the importance calculation processing, the plurality of types of area partitioning processing respectively obtaining the partitioned areas for the particular images, corresponding to the given number, selected by the selection processing.

14. A particular image area partitioning apparatus comprising:
particular image detection means for detecting whether or not a particular image exists in an image represented by given image data;
first particular image area partitioning means for partitioning off, when the existence of particular image is detected by the particular image detection means, an area of the existing particular image, to output data representing the partitioned area; and
second particular image area partitioning means for dividing, when the existence of particular image is not detected by the particular image detection means, the image represented by the given image data into particular image color areas representing the color of the particular image and the other color areas, and outputting, out of the particular image color areas, data representing the particular image color area having a shape conforming to the shape of the particular image,
wherein the particular image is a face area.

15. The particular image area partitioning apparatus according to claim 14, further comprising
particular image number detection means for detecting the number of particular images detected by the particular image detection means,
comparison judgment means for comparing the number of particular images detected by the particular image number detection means with a given number,
importance calculation means for calculating, when the comparison judgment means judges that the detected number of particular images is more than the given number, an importance degree for each of the particular images detected by the particular image detection means, and
selection means for selecting the particular images whose number is the same as the given number out of the particular images included in the image represented by the image data on the basis of the importance degrees calculated by the importance calculation means,
the first particular image area partitioning means partitioning off, for the particular images, corresponding to the given number, selected by the selection means, the area of each of the particular images.

16. A particular image area partitioning method comprising the steps of:
detecting whether or not a particular image exists in an image represented by given image data;
partitioning off, when the existence of particular image is detected, an area of the existing particular image, to output data representing the partitioned area; and
dividing, when the existence of particular image is not detected, the image represented by the given image data into particular image color areas representing the color of the particular image and the other color areas, and outputting, out of the particular image color areas, data representing the particular image color area having a shape conforming to the shape of the particular image,
wherein the particular image is a face area.

17. A computer-readable medium bearing software instructions for enabling a computer to perform predetermined operations, the predetermined operations comprising:
particular image detection processing for detecting whether or not a particular image exists in an image represented by image data given from a storage device;
first area partitioning processing for partitioning off, when the existence of particular image is detected by the particular image detection processing, an area of the existing particular image, to output data representing the partitioned area; and
second area partitioning processing for dividing, when the existence of particular image is not detected by the particular image detection processing, the image represented by the given image data into particular image color areas representing the color of the particular image and the other color areas, and outputting, out of the particular image color areas, data representing the particular image color area having a shape conforming to the shape of the particular image,
wherein the particular image is a face area.

18. The image data processing apparatus according to claim 1,
wherein the appropriateness calculation means calculates the appropriateness degree using a roundness of the shape of the partitioned area, or using a shape of skin-colored pixels.

19. An image data processing apparatus comprising:
particular image detection means for detecting whether or not a particular image exists in an image represented by given image data;
a plurality of types of area partitioning means for respectively partitioning off, when the existence of particular image is detected by the particular image detection means, an area of the existing particular image by different types of partitioning processing;
appropriateness calculation means for calculating, with respect to each of a plurality of partitioned areas respectively obtained by the plurality of types of area partitioning means, an appropriateness degree representing the degree to which the shape thereof is appropriate as a partitioning shape representing a contour of the particular image; and
output means for outputting data representing the partitioned area for which the highest appropriateness degree is calculated on the basis of the plurality of appropriateness degrees calculated by the appropriateness calculation means,
wherein the appropriateness calculation means calculates the appropriateness degree using a roundness of the shape of the partitioned area, or using a shape of skin-colored pixels, and
wherein, if the appropriateness calculation means calculates the appropriateness degree using the roundness of the shape of the partitioned area, the appropriateness degree corresponds to the degree of similarity between the roundness of the shape of the partitioned area and a roundness of an ellipse.

20. The data processing apparatus according to any one of claims 1 to 3, wherein each of the plurality of types of area partitioning means performs processing for partitioning off an area of the particular image but differ in the method of the processing for partitioning off an area of the particular image.

21. The data processing apparatus according to claim 20, wherein the processing performed by the plurality of types of area partitioning means comprises at least two of an area division extraction processing utilizing clustering, an edge search extraction processing for searching for an edge radially from a center of a face, a labeling extraction processing utilizing continuity of adjacent pixel values, an extraction processing utilizing continuity of edges in a polar coordinate image, and an extraction processing utilizing roundness.

22. The data processing apparatus according to any one of claims 1 to 3, wherein each of the plurality of types of area partitioning means comprises:

a projection information creation device for setting a plurality of projection information creating windows having a predetermined shape radially from a specific point within the image represented by the image data including the detected particular image, and creating, with respect to each of image portions within the set plurality of projection information creating windows, projection information obtained by adding pixel information for each unit pixel position in the radial direction from the specific point of the image;

a boundary position determination device for determining, with respect to each of the image portions within the plurality of projection information creating windows, a boundary position between the particular image and an image other than the particular image on the basis of the projection information for unit pixel position obtained by the projection information creation device; and a particular area determination device for determining a particular image area by connecting the plurality of boundary positions, adjacent to one another, determined by the boundary position determination device.

23. The data processing apparatus according to claim 22, wherein the projection information creating window has a rectangular shape.

24. The data processing apparatus according to claim 23, wherein the projection information creating window is rotated with the specific portion as its axis, thereby the plurality of projection information creating windows are set.

25. The particular image area partitioning apparatus according to claim 14, wherein the first particular image area partitioning means comprises:

a projection information creation device for setting a plurality of projection information creating windows having a predetermined shape radially from a specific point within the image represented by the image data including the detected particular image, and creating, with respect to each of image portions within the set plurality of projection information creating windows, projection information obtained by adding pixel information for each unit pixel position in the radial direction from the specific point of the image;

a boundary position determination device for determining, with respect to each of the image portions within the plurality of projection information creating windows, a boundary position between the particular image and an image other than the particular image on the basis of the projection information for unit pixel position obtained by the projection information creation device; and a particular area determination device for determining a particular image area by connecting the plurality of boundary positions, adjacent to one another, determined by the boundary position determination device.

26. The particular image area partitioning apparatus according to claim 25, wherein the projection information creating window has a rectangular shape.

27. The particular image area partitioning apparatus according to claim 26, wherein the projection information creating window is rotated with the specific portion as its axis, thereby the plurality of projection information creating windows are set.

* * * * *